US010826770B2

(12) United States Patent
Sethi et al.

(10) Patent No.: US 10,826,770 B2
(45) Date of Patent: Nov. 3, 2020

(54) SYNTHESIS OF MODELS FOR NETWORKS USING AUTOMATED BOOLEAN LEARNING

(71) Applicant: Cisco Technology, Inc., San Jose, CA (US)

(72) Inventors: Divjyot Sethi, Fremont, CA (US); Chandra Nagarajan, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 106 days.

(21) Appl. No.: 16/046,798

(22) Filed: Jul. 26, 2018

(65) Prior Publication Data
US 2020/0036593 A1    Jan. 30, 2020

(51) Int. Cl.
*H04L 12/24* (2006.01)
*H04L 29/06* (2006.01)

(52) U.S. Cl.
CPC ......... *H04L 41/0893* (2013.01); *H04L 41/22* (2013.01); *H04L 63/20* (2013.01)

(58) Field of Classification Search
CPC ...... H04L 41/0893; H04L 41/22; H04L 63/20
See application file for complete search history.

(56) References Cited

U.S. PATENT DOCUMENTS

| | | | |
|---|---|---|---|
| 5,204,829 | A | 4/1993 | Lyu et al. |
| 6,763,380 | B1 | 7/2004 | Mayton et al. |
| 7,003,562 | B2 | 2/2006 | Mayer |
| 7,089,369 | B2 | 8/2006 | Emberling |

(Continued)

FOREIGN PATENT DOCUMENTS

| | | |
|---|---|---|
| CN | 105471830 | 4/2016 |
| CN | 105721193 | 6/2016 |

(Continued)

OTHER PUBLICATIONS

Akella, Aditya, et al., "A Highly Available Software Defined Fabric," HotNets-XIII, Oct. 27-28, 2014, Los Angeles, CA, USA, Copyright 2014, ACM, pp. 1-7.

(Continued)

*Primary Examiner* — Blake J Rubin
(74) *Attorney, Agent, or Firm* — Polsinelli PC

(57) ABSTRACT

Systems, methods, and computer-readable media for determining a deployment model for deploying rules in a network environment in response to deployment of a contract into the network environment. In some embodiments, a method can include deploying a contract into a network environment. One or more candidate deployment configuration variables can be selected and policy configurations for deploying rules in the network environment as part of implementing policies using the contract can be determined based on the one or more candidate deployment configuration variables. Rule configuration states corresponding to the policy configuration states in the network environment can be identified based on deployment of the one or more contracts in the network environment. Subsequently, a deployment model for implementing the one or more policies in the network environment can be formed based on the policy configurations and the rule configuration states corresponding to the policy configurations.

20 Claims, 17 Drawing Sheets

(56) References Cited

U.S. PATENT DOCUMENTS

| | | | |
|---|---|---|---|
| 7,127,686 B2 | 10/2006 | Dreschler et al. |
| 7,360,064 B1 | 4/2008 | Steiss et al. |
| 7,453,886 B1 | 11/2008 | Allan |
| 7,505,463 B2 | 3/2009 | Schuba et al. |
| 7,548,967 B2 | 6/2009 | Amyot et al. |
| 7,552,201 B2 | 6/2009 | Areddu et al. |
| 7,609,647 B2 | 10/2009 | Turk et al. |
| 7,619,989 B2 | 11/2009 | Guingo et al. |
| 7,698,561 B2 | 4/2010 | Nagendra et al. |
| 7,743,274 B2 | 6/2010 | Langford et al. |
| 7,765,093 B2 | 7/2010 | Li et al. |
| 8,010,952 B2 | 8/2011 | Datla et al. |
| 8,073,935 B2 | 12/2011 | Viswanath |
| 8,103,480 B2 | 1/2012 | Korn et al. |
| 8,190,719 B2 | 5/2012 | Furukawa |
| 8,209,738 B2 | 6/2012 | Nicol et al. |
| 8,261,339 B2 | 9/2012 | Aldridge et al. |
| 8,312,261 B2 | 11/2012 | Rao et al. |
| 8,375,117 B2 | 2/2013 | Venable, Sr. |
| 8,441,941 B2 | 5/2013 | McDade et al. |
| 8,479,267 B2 | 7/2013 | Donley et al. |
| 8,484,693 B2 | 7/2013 | Cox et al. |
| 8,494,977 B1 | 7/2013 | Yehuda et al. |
| 8,554,883 B2 | 8/2013 | Sankaran |
| 8,589,934 B2 | 11/2013 | Makljenovic et al. |
| 8,621,284 B2 | 12/2013 | Kato |
| 8,627,328 B2 | 1/2014 | Mousseau et al. |
| 8,693,344 B1 | 4/2014 | Adams et al. |
| 8,693,374 B1 | 4/2014 | Murphy et al. |
| 8,761,036 B2 | 6/2014 | Fulton et al. |
| 8,782,182 B2 | 7/2014 | Chaturvedi et al. |
| 8,824,482 B2 | 9/2014 | Kajekar et al. |
| 8,910,143 B2 | 12/2014 | Cohen et al. |
| 8,914,843 B2 | 12/2014 | Bryan et al. |
| 8,924,798 B2 | 12/2014 | Jerde et al. |
| 8,966,029 B2 * | 2/2015 | Zhang ................ G06F 9/45558 |
| | | | 709/221 |
| 9,019,840 B2 | 4/2015 | Salam et al. |
| 9,038,151 B1 | 5/2015 | Chua et al. |
| 9,055,000 B1 | 6/2015 | Ghosh et al. |
| 9,106,555 B2 | 8/2015 | Agarwal et al. |
| 9,137,096 B1 | 9/2015 | Yehuda et al. |
| 9,225,601 B2 | 12/2015 | Khurshid et al. |
| 9,246,818 B2 | 1/2016 | Deshpande et al. |
| 9,264,922 B2 | 2/2016 | Gillot et al. |
| 9,276,877 B1 | 3/2016 | Chua et al. |
| 9,319,300 B2 | 4/2016 | Huynh Van et al. |
| 9,344,348 B2 | 5/2016 | Ivanov et al. |
| 9,369,434 B2 | 6/2016 | Kim et al. |
| 9,389,993 B1 | 7/2016 | Okmyanskiy et al. |
| 9,405,553 B2 | 8/2016 | Branson et al. |
| 9,444,842 B2 | 9/2016 | Porras et al. |
| 9,497,207 B2 | 11/2016 | Dhawan et al. |
| 9,497,215 B2 | 11/2016 | Vasseur et al. |
| 9,544,224 B2 | 1/2017 | Chu et al. |
| 9,548,965 B2 | 1/2017 | Wang et al. |
| 9,553,845 B1 | 1/2017 | Talmor et al. |
| 9,571,502 B2 | 2/2017 | Basso et al. |
| 9,571,523 B2 | 2/2017 | Porras et al. |
| 9,594,640 B1 | 3/2017 | Chheda |
| 9,596,141 B2 | 3/2017 | McDowall |
| 9,641,249 B2 | 5/2017 | Kaneriya et al. |
| 9,654,300 B2 | 5/2017 | Pani |
| 9,654,361 B2 | 5/2017 | Vasseur et al. |
| 9,654,409 B2 | 5/2017 | Yadav et al. |
| 9,660,886 B1 | 5/2017 | Ye et al. |
| 9,660,897 B1 | 5/2017 | Gredler |
| 9,667,645 B1 | 5/2017 | Belani et al. |
| 9,680,875 B2 | 6/2017 | Knjazihhin et al. |
| 9,686,180 B2 | 6/2017 | Chu et al. |
| 9,686,296 B1 | 6/2017 | Murchison et al. |
| 9,690,644 B2 | 6/2017 | Anderson et al. |
| 9,781,004 B2 | 10/2017 | Danait et al. |
| 9,787,559 B1 | 10/2017 | Schroeder |
| 9,906,401 B1 * | 2/2018 | Rao ........................ H04L 41/12 |
| 9,998,247 B1 | 6/2018 | Choudhury et al. |
| 10,084,795 B2 | 9/2018 | Akireddy et al. |
| 10,084,833 B2 | 9/2018 | McDonnell et al. |
| 10,084,895 B2 | 9/2018 | Kasat et al. |
| 10,135,670 B2 * | 11/2018 | Wackerly ................ H04L 12/28 |
| 10,193,706 B2 * | 1/2019 | Bhattacharya ........ H04L 12/462 |
| 10,270,712 B1 * | 4/2019 | Lippitt .................. H04L 47/828 |
| 10,375,121 B2 * | 8/2019 | Hamou ................ G06F 9/45558 |
| 2002/0143855 A1 | 10/2002 | Traversat et al. |
| 2002/0178246 A1 | 11/2002 | Mayer |
| 2003/0229693 A1 | 12/2003 | Mahlik et al. |
| 2004/0073647 A1 | 4/2004 | Gentile et al. |
| 2004/0168100 A1 | 8/2004 | Thottan et al. |
| 2005/0108389 A1 | 5/2005 | Kempin et al. |
| 2007/0011629 A1 | 1/2007 | Shacham et al. |
| 2007/0124437 A1 | 5/2007 | Chervets |
| 2007/0214244 A1 | 9/2007 | Hitokoto et al. |
| 2008/0031147 A1 | 2/2008 | Fieremans et al. |
| 2008/0117827 A1 | 5/2008 | Matsumoto et al. |
| 2008/0133731 A1 | 6/2008 | Bradley et al. |
| 2008/0172716 A1 | 7/2008 | Talpade et al. |
| 2009/0240758 A1 | 9/2009 | Pasko et al. |
| 2009/0249284 A1 | 10/2009 | Antosz et al. |
| 2010/0191612 A1 | 7/2010 | Raleigh |
| 2010/0198909 A1 | 8/2010 | Kosbab et al. |
| 2011/0093612 A1 | 4/2011 | Murakami |
| 2011/0295983 A1 | 12/2011 | Medved et al. |
| 2012/0054163 A1 | 3/2012 | Liu et al. |
| 2012/0096513 A1 * | 4/2012 | Raleigh ............... H04L 41/0816 |
| | | | 726/1 |
| 2012/0198073 A1 | 8/2012 | Srikanth et al. |
| 2012/0297061 A1 | 11/2012 | Pedigo et al. |
| 2013/0097660 A1 | 4/2013 | Das et al. |
| 2013/0191516 A1 | 7/2013 | Sears |
| 2014/0019597 A1 | 1/2014 | Nath et al. |
| 2014/0177638 A1 | 6/2014 | Bragg et al. |
| 2014/0222996 A1 | 8/2014 | Vasseur et al. |
| 2014/0304831 A1 | 10/2014 | Hidlreth et al. |
| 2014/0307556 A1 | 10/2014 | Zhang |
| 2014/0321277 A1 | 10/2014 | Lynn, Jr. et al. |
| 2014/0379915 A1 | 12/2014 | Yang et al. |
| 2015/0019756 A1 | 1/2015 | Masuda |
| 2015/0052095 A1 * | 2/2015 | Yang ........................ G06F 8/10 |
| | | | 706/47 |
| 2015/0113143 A1 | 4/2015 | Stuart et al. |
| 2015/0124826 A1 | 5/2015 | Edsall et al. |
| 2015/0186206 A1 | 7/2015 | Bhattacharya et al. |
| 2015/0234695 A1 | 8/2015 | Cuthbert et al. |
| 2015/0244617 A1 | 8/2015 | Nakil et al. |
| 2015/0271104 A1 | 9/2015 | Chikkamath et al. |
| 2015/0295771 A1 | 10/2015 | Cuni et al. |
| 2015/0365314 A1 | 12/2015 | Hiscock et al. |
| 2015/0381484 A1 | 12/2015 | Hira et al. |
| 2016/0020993 A1 | 1/2016 | Wu et al. |
| 2016/0021141 A1 | 1/2016 | Liu et al. |
| 2016/0026631 A1 | 1/2016 | Salam et al. |
| 2016/0036636 A1 | 2/2016 | Erickson et al. |
| 2016/0048420 A1 | 2/2016 | Gourlay et al. |
| 2016/0065618 A1 * | 3/2016 | Banerjee ................ G06F 9/5077 |
| | | | 726/1 |
| 2016/0078220 A1 | 3/2016 | Scharf et al. |
| 2016/0080350 A1 | 3/2016 | Chaturvedi et al. |
| 2016/0099883 A1 | 4/2016 | Voit et al. |
| 2016/0105317 A1 | 4/2016 | Zimmermann et al. |
| 2016/0112246 A1 | 4/2016 | Singh et al. |
| 2016/0112269 A1 | 4/2016 | Singh et al. |
| 2016/0124742 A1 * | 5/2016 | Rangasamy ............ H04L 67/10 |
| | | | 717/103 |
| 2016/0149751 A1 | 5/2016 | Pani et al. |
| 2016/0164748 A1 | 6/2016 | Kim |
| 2016/0218918 A1 * | 7/2016 | Chu ....................... H04L 41/5054 |
| 2016/0224277 A1 | 8/2016 | Batra et al. |
| 2016/0241436 A1 | 8/2016 | Fourie et al. |
| 2016/0254964 A1 | 9/2016 | Benc |
| 2016/0267384 A1 | 9/2016 | Salam et al. |
| 2016/0323319 A1 | 11/2016 | Gourlay et al. |
| 2016/0330076 A1 | 11/2016 | Tiwari et al. |
| 2016/0352566 A1 | 12/2016 | Mekkattuparamban et al. |
| 2016/0380892 A1 | 12/2016 | Mahadevan et al. |

(56) References Cited

U.S. PATENT DOCUMENTS

| | | | |
|---|---|---|---|
| 2017/0026292 | A1 | 1/2017 | Smith et al. |
| 2017/0031800 | A1 | 2/2017 | Shani et al. |
| 2017/0031970 | A1 | 2/2017 | Burk |
| 2017/0048110 | A1 | 2/2017 | Wu et al. |
| 2017/0048126 | A1 | 2/2017 | Handige Shankar et al. |
| 2017/0054758 | A1 | 2/2017 | Maino et al. |
| 2017/0063599 | A1 | 3/2017 | Wu et al. |
| 2017/0093630 | A1 | 3/2017 | Foulkes |
| 2017/0093664 | A1 | 3/2017 | Lynam et al. |
| 2017/0093750 | A1 | 3/2017 | McBride et al. |
| 2017/0093918 | A1 | 3/2017 | Banerjee et al. |
| 2017/0111259 | A1 | 4/2017 | Wen et al. |
| 2017/0118167 | A1 | 4/2017 | Subramanya et al. |
| 2017/0126740 | A1 | 5/2017 | Bejarano Ardila et al. |
| 2017/0126792 | A1 | 5/2017 | Halpern et al. |
| 2017/0134233 | A1 | 5/2017 | Dong et al. |
| 2017/0163442 | A1 | 6/2017 | Shen et al. |
| 2017/0187577 | A1 | 6/2017 | Nevrekar et al. |
| 2017/0195187 | A1 | 7/2017 | Bennett et al. |
| 2017/0195257 | A1* | 7/2017 | Annaluru .............. H04L 49/253 |
| 2017/0206129 | A1 | 7/2017 | Yankilevich et al. |
| 2017/0222873 | A1 | 8/2017 | Lee et al. |
| 2017/0339247 | A1* | 11/2017 | Tiwari ................ H04L 41/0806 |
| 2017/0353355 | A1 | 12/2017 | Danait et al. |
| 2018/0005186 | A1* | 1/2018 | Hunn .................... G06F 40/103 |
| 2018/0069754 | A1 | 3/2018 | Dasu et al. |
| 2018/0167294 | A1 | 6/2018 | Gupta et al. |
| 2018/0173567 | A1* | 6/2018 | Olshefski .............. G06F 9/5011 |
| 2019/0098056 | A1* | 3/2019 | Pitre ...................... H04L 63/20 |
| 2019/0171474 | A1* | 6/2019 | Malboubi ........... G06F 9/45558 |
| 2019/0311069 | A1* | 10/2019 | Ivanov ................ G06F 16/9024 |
| 2019/0334909 | A1* | 10/2019 | Schmitt ................. G06F 3/0659 |
| 2019/0386913 | A1* | 12/2019 | Wei ..................... H04L 49/1515 |

FOREIGN PATENT DOCUMENTS

| | | |
|---|---|---|
| CN | 105721297 | 6/2016 |
| CN | 106130766 | 11/2016 |
| CN | 106603264 | 4/2017 |
| CN | 103701926 | 6/2017 |
| WO | WO 2015/014177 | 2/2015 |
| WO | WO 2015/187337 | 12/2015 |
| WO | WO 2016/011888 | 1/2016 |
| WO | WO 2016/039730 | 3/2016 |
| WO | WO 2016/072996 | 5/2016 |
| WO | WO 2016/085516 | 6/2016 |
| WO | WO 2016/093861 | 6/2016 |
| WO | WO 2016/119436 | 8/2016 |
| WO | WO 2016/130108 | 8/2016 |
| WO | WO 2016/161127 | 10/2016 |
| WO | WO 2017/031922 | 3/2017 |
| WO | WO 2017/039606 | 3/2017 |
| WO | WO 2017/105452 | 6/2017 |

OTHER PUBLICATIONS

Alsheikh, Mohammad Abu, et al., "Machine Learning in Wireless Sensor Networks: Algorithms, Strategies, and Application," Mar. 19, 2015, pp. 1-23.

Author Unknown, "Aids to Pro-active Management of Distributed Resources through Dynamic Fault-Localization and Availability Prognosis," FaultLocalization-TR01-CADlab, May 2006, pp. 1-9.

Author Unknown, "Requirements for applying formal methods to software-defined networking," Telecommunication Standardization Sector of ITU, Series Y: Global Information Infrastructure, Internet Protocol Aspects and Next-Generation Networks, Apr. 8, 2015, pp. 1-20.

Cisco Systems, Inc., "Cisco Application Centric Infrastructure 9ACI Endpoint Groups (EPG) Usange and Design," White Paper, May 2014, pp. 1-14.

Cisco, "Verify Contracts and Rules in the ACI Fabric," Cisco, Updated Aug. 19, 2016, Document ID: 119023, pp. 1-20.

De Silva et al., "Network-wide Security Analysis," Semantic Scholar, Oct. 25, 2011, pp. 1-11.

Dhawan, Mohan, et al., "SPHINX: Detecting Security Attacks in Software-Defined Networks," NDSS 2015, Feb. 8-11, 2015, San Diego, CA, USA, Copyright 2015 Internet Society, pp. 1-15.

Fayaz, Seyed K., et al., "Efficient Network Reachability Analysis using a Succinct Control Plane Representation," 2016, ratul.org, pp. 1-16.

Feldmann, Anja, et al., "IP Network Configuration for Intradomain Traffic Engineering," Semantic Scholar, accessed on Jul. 20, 2017, pp. 1-27.

Han, Wonkyu, et al., "LPM: Layered Policy Management for Software-Defined Networks," Mar. 8, 2016, pp. 1-8.

Han, Yoonseon, et al., "An Intent-based Network Virtualization Platform for SDN," 2016 I FIP, pp. 1-6.

Kazemian, Peyman, et al., "Real Time Network Policy Checking using Header Space Analysis," USENIX Association, 10th USENIX Symposium on Networked Systems Design and Implementation (NSDI '13) pp. 99-111.

Khatkar, Pankaj Kumar, "Firewall Rule Set Analysis and Visualization, A Thesis Presented in Partial Fulfillment of the Requirements for the Degree Master of Science," Arizona State University, Dec. 2014, pp. 1-58.

Le, Franck, et al., "Minerals: Using Data Mining to Detect Router Misconfigurations," CyLab, Carnegie Mellon University, CMU-CyLab-06-008, May 23, 2006, pp. 1-14.

Liang, Chieh-Jan Mike, et al., "SIFT: Building an Internet of Safe Things," Microsoft, IPSN' 15, Apr. 14-16, 2015, Seattle, WA, ACM 978, pp. 1-12.

Lindem, A., et al., "Network Device YANG Organizational Model draft-rtgyangdt-rtgwg-device-model-01," Network Working Group, Internet-draft, Sep. 21, 2015, pp. 1-33.

Liu, Jason, et al., "A Real-Time Network Simulation Infrastructure Based on Open VPN," Journal of Systems and Software, Aug. 4, 2008, pp. 1-45.

Lopes, Nuno P., et al., "Automatically verifying reachability and well-formedness in P4 Networks," Microsoft, accessed on Jul. 18, 2017, pp. 1-13.

Mai, Haohui, et al., "Debugging the Data Plane with Anteater," SIGCOMM11, Aug. 15-19, 2011, pp. 1-12.

Miller, Nancy, et al., "Collecting Network Status Information for Network-Aware Applications," INFOCOM 2000, pp. 1-10.

Miranda, Joao Sales Henriques, "Fault Isolation in Software Defined Networks," www.gsd.inescid.pt, pp. 1-10.

Moon, Daekyeong, et al., "Bridging the Software/Hardware Forwarding Divide," Berkeley.edu, Dec. 18, 2010, pp. 1-15.

Panda, Aurojit, et al., "SCL: Simplifying Distributed SDN Control Planes," people.eecs.berkeley.edu, Mar. 2017, pp. 1-17.

Shin, Seugwon, et al., "FRESCO: Modular Composable Security Services for Software-Defined Networks," To appear in the ISOC Network and Distributed System Security Symposium, Feb. 2013, pp. 1-16.

Shukla, Apoorv, et al., "Towards meticulous data plane monitoring," kaust.edu.sa, access on Aug. 1, 2017, pp. 1-2.

Tang, Yongning, et al., "Automatic belief network modeling via policy inference for SDN fault localization," Journal of Internet Services and Applications, 2016, pp. 1-13.

Tomar, Kuldeep, et al., "Enhancing Network Security and Performance Using Optimized ACLs," International Journal in Foundations of Computer Science & Technology (IJFCST), vol. 4, No. 6, Nov. 2014, pp. 25-35.

Tongaonkar, Alok, et al., "Inferring Higher Level Policies from Firewall Rules," Proceedings of the 21st Large Installation System Administration Conference (LISA '07), Nov. 11-16, 2007, pp. 1-14.

Yu et al., "A Flexible Framework for Wireless-Based Intelligent Sensor with Reconfigurability, Dynamic adding, and Web interface," Conference Paper, Jul. 24, 2006, IEEE 2006, pp. 1-7.

Zhou, Shijie, et al., "High-Performance Packet Classification on GPU," 2014 IEEE, pp. 1-6.

Cisco Systems, Inc., "The Cisco Application Policy Infrastructure Controller Introduction: What is the Cisco Application Policy Infrastructure Controller?" Jul. 31, 2014, 19 pages.

(56) References Cited

OTHER PUBLICATIONS

Jain, Praveen, et al., "In-Line Distributed and Stateful Security Policies for Applications in a Network Environment," Cisco Systems, Inc., Aug. 16, 2016, 13 pages.

Maldonado-Lopez, Ferney, et al., "Detection and prevention of firewall—rule conflicts on software-defined networking," 2015 7th International Workshop on Reliable Networks Design and Modeling (RNDM), IEEE, Oct. 5, 2015, pp. 259-265.

Vega, Andres, et al., "Troubleshooting Cisco Application Centric Infrastructure: Analytical problem solving applied to the Policy Driven Data Center," Feb. 15, 2016, 84 pages.

Xia, Wenfeng, et al., "A Survey on Software-Defined Networking," IEEE Communications Surveys and Tutorials, Mar. 16, 2015, pp. 27-51.

International Search Report and Written Opinion from the International Searching Authority, dated Oct. 4, 2019, 15 pages, for corresponding International Patent Application No. PCT/US2019/042872.

Al-Shaer, Ehab, et al., "FlowChecker: Configuration Analysis and Verification of Federated OpenFlow Instrastructures," SafeConfig '10, Oct. 4, 2010, pp. 37-44.

Banikazemi, Mohammad, et al., "Meridian: An SDN Platform for Cloud Network Services," Software Defined Networks, IEEE Communications Magazine, Feb. 1, 2013, pp. 120-127.

Cisco: "The Cisco Application Policy Infrastructure Controller Introduction: What is the Cisco Application Policy Infrastructure Controller?" Jul. 31, 2014, pp. 1-19.

Machado, Cristian Cleder, "An Advanced Refinement toolkit for Handling Service Level Agreements in Software-Defined Networking," Journal of Network and Computer Applications, Academic Press, New York, Apr. 21, 2017, pp. 1-16.

QOSMOS: "GBP Use case; NFVEVE(15)000090_GroupBasedPolicy_Use_Case.r3," May 7, 2015, pp. 1-4 pages.

Tammana, Praveen, et al., "Fault Localization in Large-Scale Network Policy Deployment," 2018 IEEE International Conference on Distributed Computing Systems, pp. 54-64.

\* cited by examiner

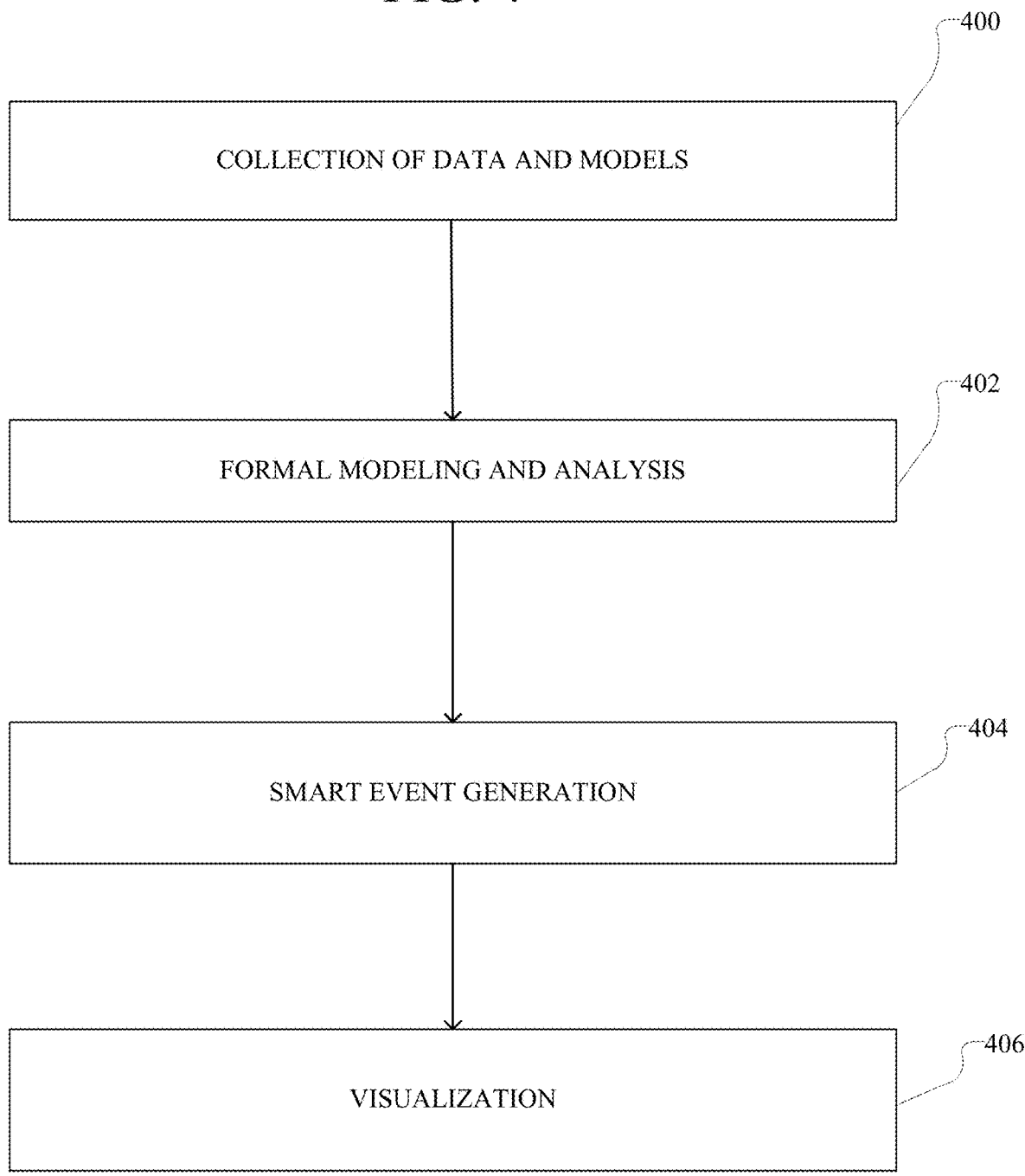

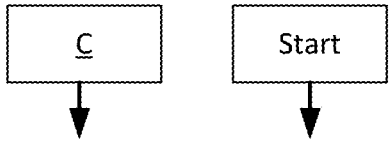

- Initialization: we initialize observationHistory to be empty (i.e. Boolean value false) as no history is observed so far. Since no learning has been done for rulePresent, that is also set to be empty (i.e. Boolean value false).
- Now, suppose we run the algorithm on a configuration which has aepgEnforcement = true (i.e. enforced), and l3OutEPGEnforcement = true (i.e. enforced). In this case, suppose we see a rule from L3OutEPG->AEPG.
  • Based on this, we check that this configuration is not part of history: we do f observationHistory && (aepgEnforcement && l3OutEPGEnforcement) as we have observed this combination, and it turns out to be false as this combination has not been observed.
  • Thus, we will set observationHistory = observationHistory || (aepgEnforcement && l3OutEPGEnforcement), i.e. we add the policy configuration of AEPG and l3OutEPG are enforced to observationHistory.
  • And we also set rulePresent = rulePresent || (aepgEnforcement && l3OutEPGEnforcement), i.e. we note that a rule is present for the policy configuration of AEPG and l3OutEPG are enforced.

- Next, suppose we run the algorithm on a configuration which has aepgEnforcement = true (i.e. enforced), and l3OutEPGEnforcement = *false*. In this case, suppose we do not see a rule from L3OutEPG->AEPG.
  • We check that this configuration is not part of history: we do observationHistory && (observationHistory && NOT(l3OutEPGEnforcement) and it turns out to be *false*, i.e. the policy configuration of AEPG is enforced and L3OutEPG is not enforced is not part of the observationHistory
  • Thus, we will set observationHistory = observationHistory || (aepgEnforcement && NOT(l3OutEPGEnforcement)), i.e. we add the policy configuration of AEPG is enforced and L3OutEPG is not enforced to observationHistory.
  • And we keep rulePresent as is because there is no rule in this case, i.e. we abstain from noting a rule is present for the policy configuration of AEPG is enforced and L3OutEPG is not enforced.

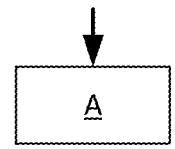

FIG. 6A

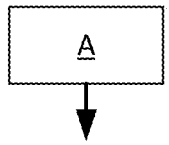

- Next, suppose we run the algorithm on a configuration which has aepgEnforcement = false (i.e. unenforced), and l3OutEPGEnforcement = *true*. In this case, suppose we see a rule from L3OutEPG->AEPG.
  - We check that this configuration is not part of history; we do observationHistory && (NOT(aepgEnforcement) && l3OutEPGEnforcement) and it turns out to be false, i.e. the policy configuration of AEPG is not enforced and L3OutEPG is enforced is not part of the observationHistory
  - Thus, we will set observationHistory = observationHistory || (NOT(aepgEnforcement) && l3OutEPGEnforcement), i.e. we add the policy configuration of AEPG is not enforced and L3OutEPG is enforced to the observationHistory
  - We do see a rule so we update rulePresent= rulePresent || (NOT(aepgEnforcement) && l3OutEPGEnforcement), where NOT says that Aepg is not enforced and l3Out is enforced for the rule to be deployed, i.e. we note that a rule is present for the policy configuration of AEPG is not enforced and L3OutEPG is enforced.

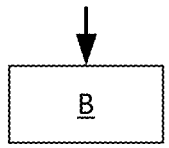

FIG. 6B

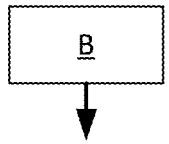

- Finally, now suppose, we run the algorithm on a configuration which *AGAIN* has aepgEnforcement = true (i.e. enforced), and l3OutEPGEnforcement = true, i.e. the policy configuration of AEPG and L3OutEPG is enforced. *However, we observe that there is no rule present, unlike the past when we did observe a rule present.*

- due to the enforce direction of context set to ingress NOTE: there is no variable for ingress/egress
  - We observe this by checking that observationHistory && (aepgEnforcement && l3OutEPGEnforcement) = true and thus has been observed configuration is contained in history, i.e. the policy configuration of AEPG and L3OutEPG is enforced is part of the observation history.
  - However, we check that rulePresent for aepgEnforcement = true and l3OutEPGEnforcement = true for existing rulePresent, i.e. that a rule has been observed for the policy configuration of AEPG and L3OutEPG is enforced in observationHistory, in contrast to the fresh observation, i.e. that a rule has not been observed for the policy configuration of AEPG and L3OutEPG.
  - The algorithm thus detects a conflict that indicates a discrepancy and the algorithm returns to the user to request additional variable as the learning feature set is insufficient!
  - The user diagnoses this: the above can indicate either a run-time ACI bug exists, or, a need for new variable exists.
  - In this case, the user diagnoses that additional information is required to model rulePresent correctly. Specifically, one needs to know not just that AEPG is enforced with aepgEnforcement, one is also required to know the direction of this enforcement which affects deployment.
  - This direction is encoded using the variable: aEPGCtxEnforcementDir -- when this is true, the rule is deployed on the TOR which has aEPG on it, else it is deployed on the TOR with L3OutEPG on it.

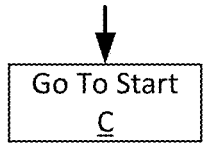

FIG. 6C

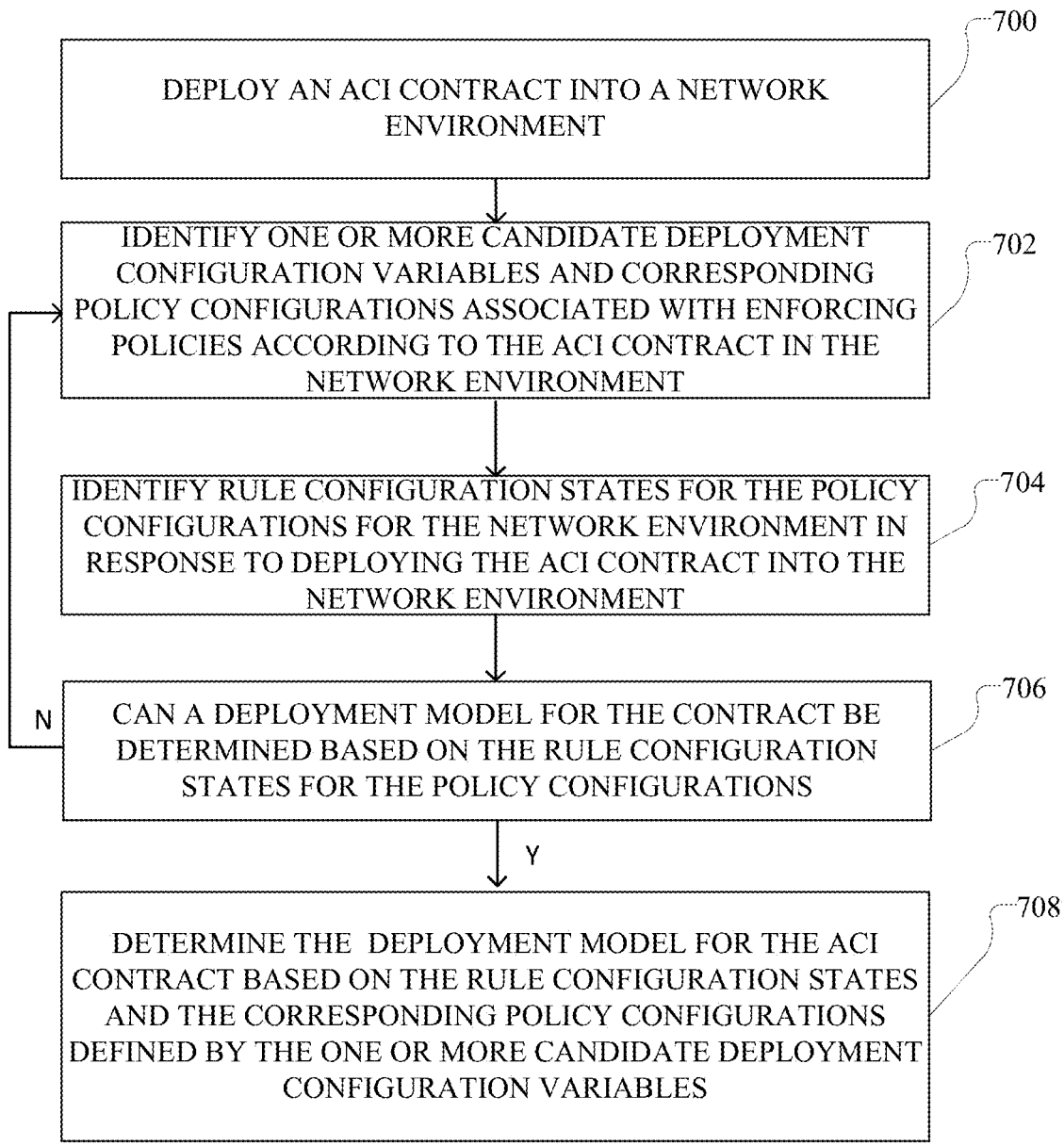

INTERFACES
802

CPU 804

MEMORY
806

PROCESSOR
808

810

SYNTHESIS OF MODELS FOR NETWORKS USING AUTOMATED BOOLEAN LEARNING

The present technology pertains to synthesizing models for networks and in particular to identifying deployment models for deploying rules in networks in response to deployment of contracts into the networks.

BACKGROUND

In a network environment, sensors can be placed at various devices or elements in the network to collect flow data and network statistics from different locations. The collected data from the sensors can be analyzed to monitor and troubleshoot the network. The data collected from the sensors can provide valuable details about the status, security, or performance of the network, as well as any network elements. Information about the sensors can also help interpret the data from the sensors, in order to infer or ascertain additional details from the collected data. For example, understanding the placement of a sensor relative to other sensors in the network can provide a context to the data reported by the sensors, which can further help identify specific patterns or conditions in the network. Network tools can be used to generate data related to flow data and network statistics.

Software-defined networks (SDNs) have been developed in order to improve performance in networks and provide greater control in managing networks. SDNs can decouple network control and forwarding functions to create programmable network control. In turn, this can abstract an underlying network infrastructure from applications and network services.

In typical SDNs, policies can be configured in the SDN controller which ultimately deploys rules in the switches to enforce control on underlying traffic. In order to provide assurance for SDNs, in particular with respect to functioning of the networks using policies, deployments of the policies into the network as switch rules need to be modeled. More specifically, how and whether rules are deployed at nodes and switches in SDNs in response to configuration of policies in the controller need to be modeled in order to provide assurance for the networks. This is problematic as modeling deployments of policies often requires a deep understanding of SDN behavior and involves multiple interactions with SDN engineering teams to understand how to actually model these deployments. Often times this can take up to several months to complete based on the large number of interactions with SDN engineering teams required to create the deployment models. Additionally, modeling deployments of policies is problematic as different versions of SDNs can exhibit different behaviors that can require remodeling each time new versions of the networks are released.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 4 illustrates an example method embodiment for network assurance;

FIGS. 6A-6C show a flow of pseudo-code for developing a deployment model for an ACI contract;

FIG. 7 illustrates a flowchart for an example method of identifying a deployment model for a contract;

DESCRIPTION OF EXAMPLE EMBODIMENTS

Figure 1A:
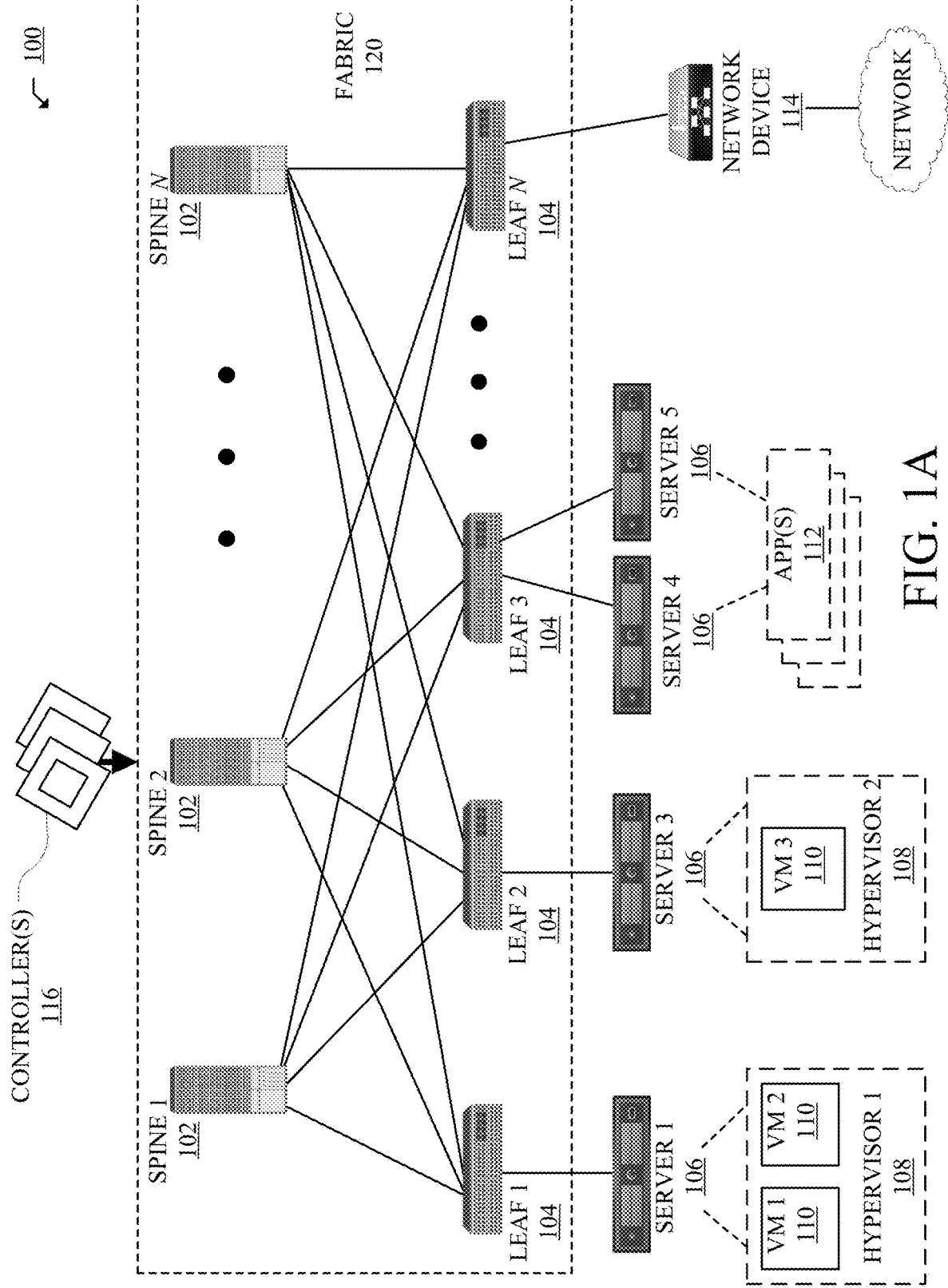
FIGS. 1A and 1B illustrate example network environments.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

OVERVIEW

A method can include deploying a contract into a network environment. One or more candidate deployment configuration variables can be selected for implementing one or more policies in the network environment through the one or more contracts. Further, policy configurations for deploying rules in the network environment as part of implementing the one or more policies in the network environment can be determined based on the one or more candidate deployment configuration variables. The method can include identifying, based on deployment of the one or more contracts in the network environment, rule configuration states in the network environment corresponding to the policy configurations determined from the one or more candidate deployment configuration variables. Additionally, the method can include forming a deployment model for implementing the one or more policies in the network environment based on the policy configurations and the rule configuration states corresponding to the policy configurations.

A system can deploy one or more contracts into a network environment and select one or more candidate deployment configuration variables input by a user for implementing one or more policies in the network environment through the one or more contracts. Further, the system can determine policy configurations for deploying rules in the network environment as part of implementing the one or more policies in the network environment based on the one or more candidate deployment configuration variables. Based on deployment of the one or more contracts in the network environment, rule configuration states in the network environment corresponding to the policy configurations can be determined from the one or more candidate deployment configuration variables. Additionally, the system can form a deployment model for implementing the one or more policies in the network environment based on the policy configurations and the rule configuration states corresponding to the policy configurations.

A system can deploy one or more contracts into a network environment and select one or more candidate deployment configuration variables for implementing one or more policies in the network environment through the one or more contracts. Further, the system can determine policy configurations for deploying rules in the network environment as part of implementing the one or more policies in the network environment based on the one or more candidate deployment configuration variables. Based on deployment of the one or more contracts in the network environment, rule configuration states in the network environment corresponding to the policy configurations can be determined by a network assurance appliance from the one or more candidate deployment configuration variables. Additionally, the system can form a deployment model for implementing the one or more policies in the network environment based on the policy configurations and the rule configuration states corresponding to the policy configurations.

EXAMPLE EMBODIMENTS

The disclosed technology addresses the need in the art for modeling deployments of contracts into network environment, e.g. for providing network assurance. The present technology involves system, methods, and computer-readable media for identifying deployment models for deploying rules in networks in response to deployment of contracts into the networks in order to implement policies. The present technology will be described in the following disclosure as follows.

Figure 1B:
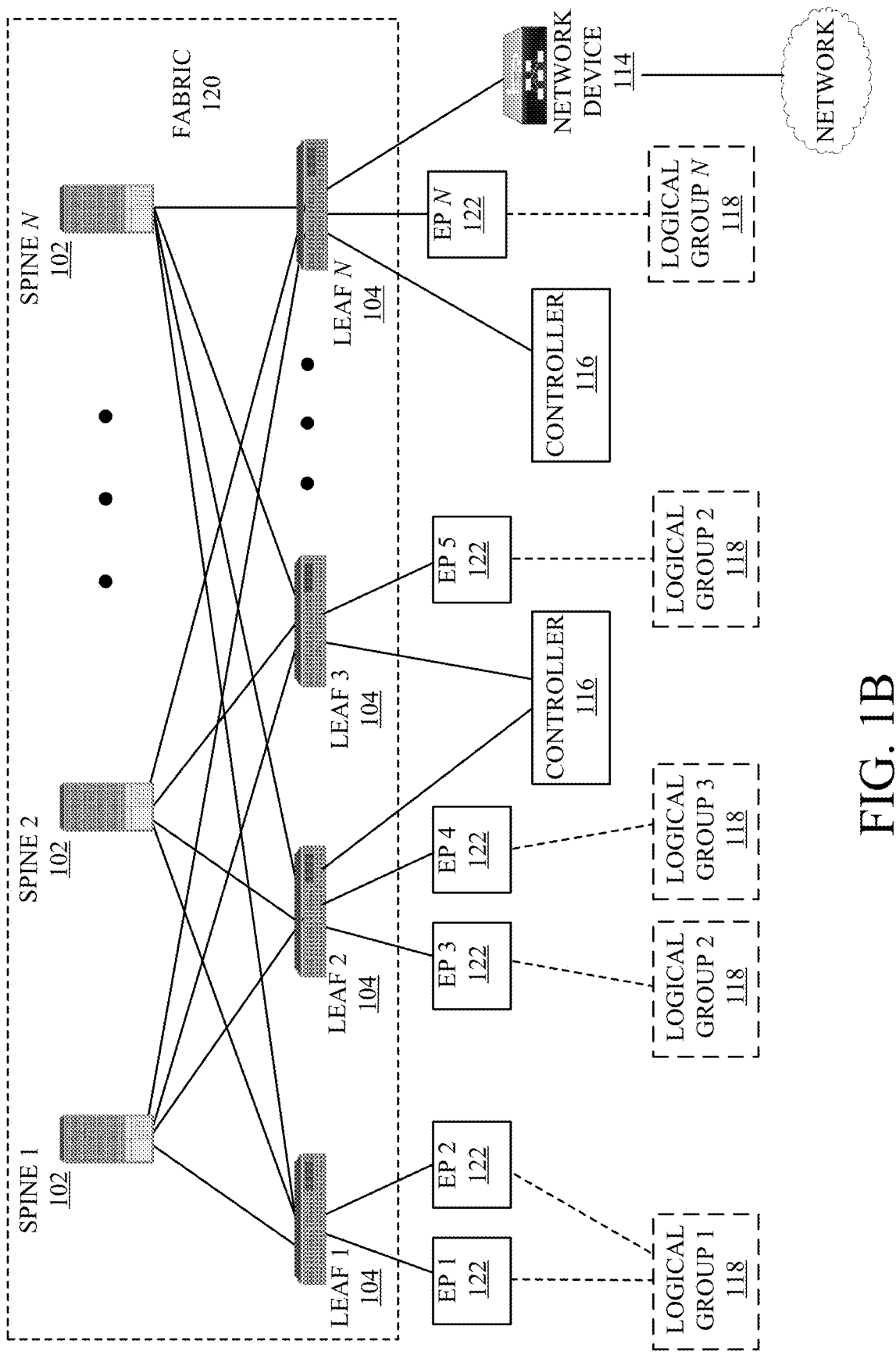
Figure 5:
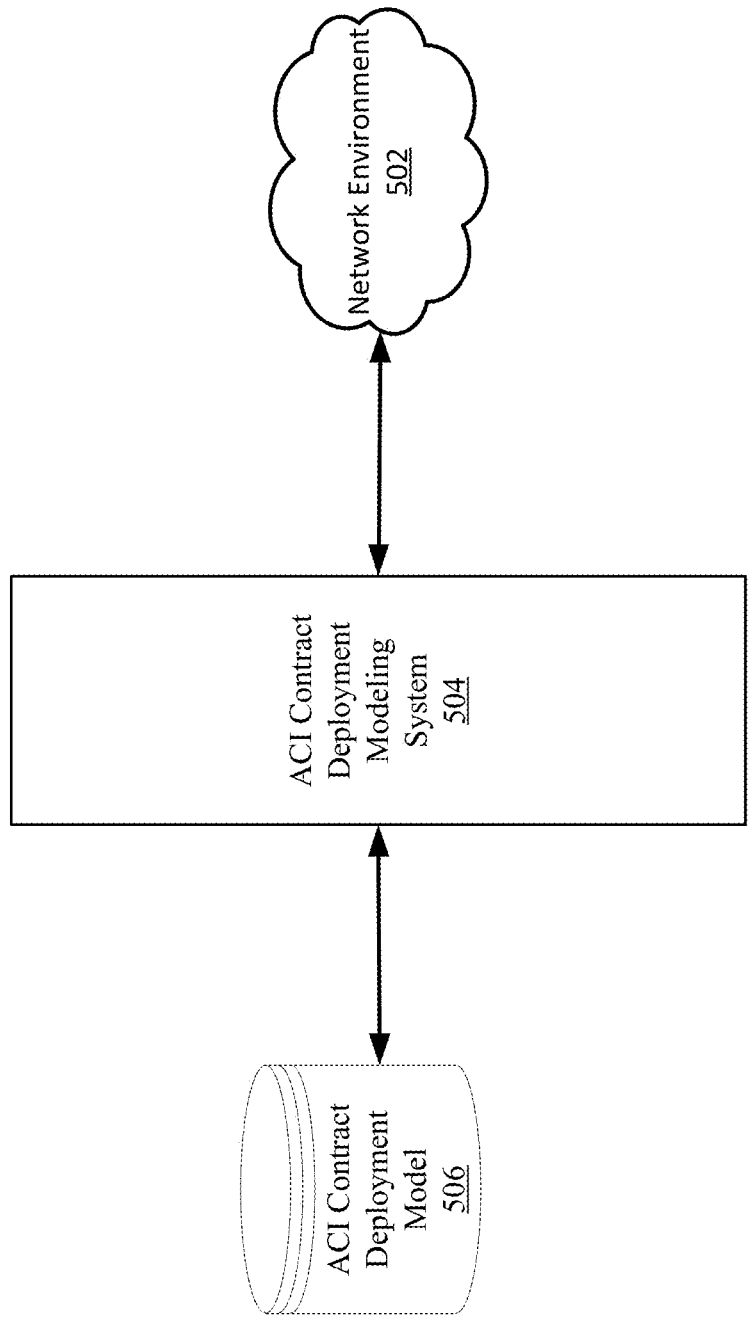
FIG. 5 illustrates an environment for generating deployment models for contracts in network environments.
Figure 8:
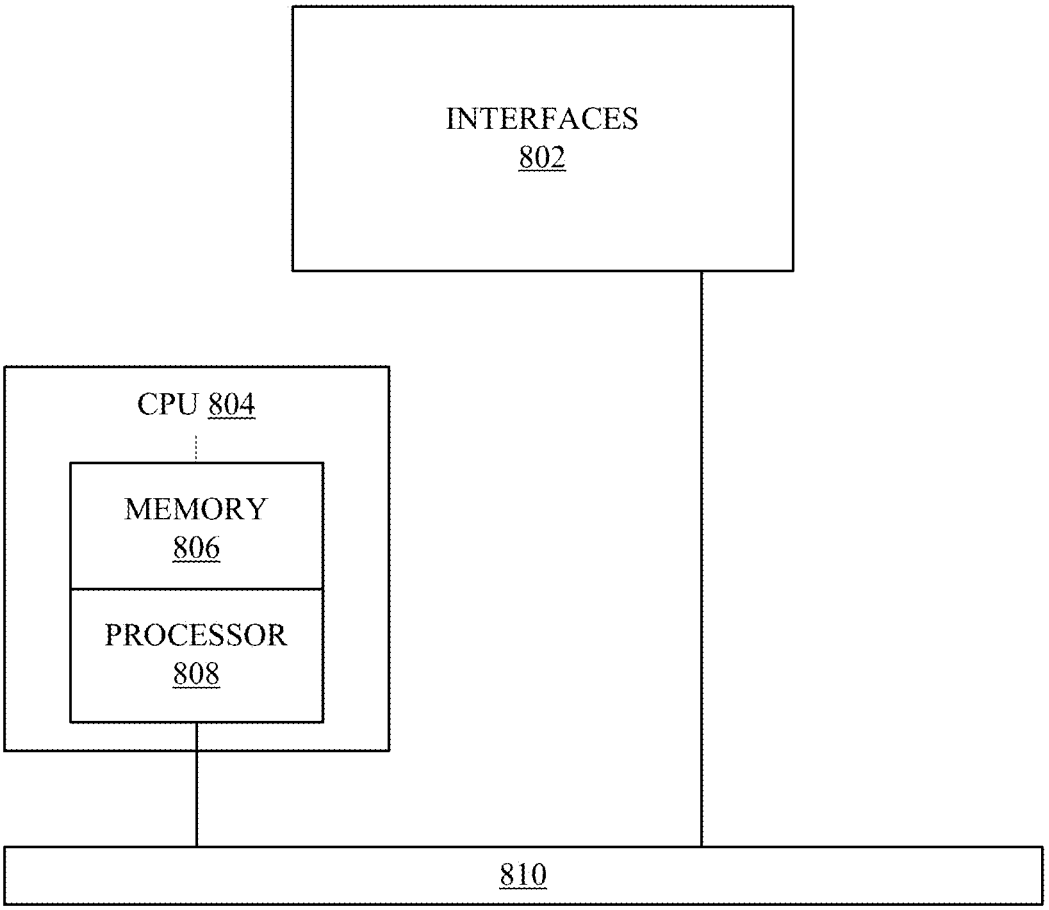
FIG. 8 illustrates an example network device in accordance with various embodiments.
Figure 9:
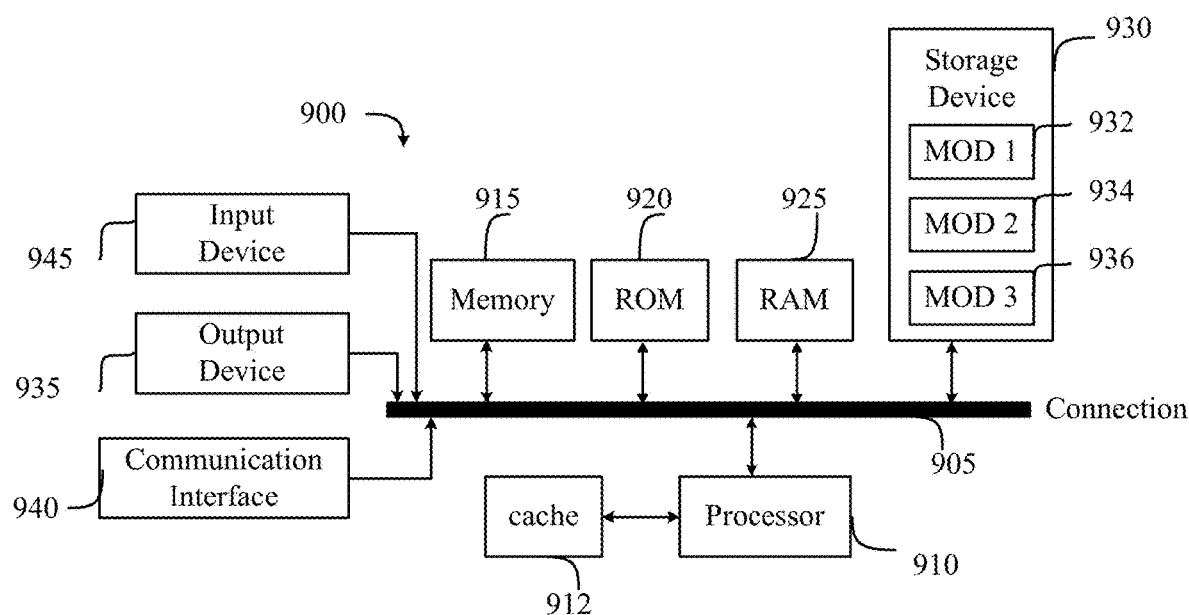
FIG. 9 illustrates an example computing device in accordance with various embodiments.

The discussion begins with an introductory discussion of network assurance and a description of example computing environments, as illustrated in FIGS. 1A and 1B. A discussion of network models for network assurance, as shown in FIGS. 2A through 2D, and network assurance systems and methods, as shown in FIGS. 3A-C and 4 will then follow. The discussion continues with a description and examples of developing deployment models for contracts, as shown in FIGS. 5-7. The discussion concludes with a description of an example network device, as illustrated in FIG. 8, and an example computing device, as illustrated in FIG. 9, including example hardware components suitable for hosting software applications and performing computing operations. The disclosure now turns to an introductory discussion of network assurance.

Network assurance is the guarantee or determination that the network is behaving as intended by the network operator and has been configured properly (e.g., the network is doing network and individual network elements (e.g., switches, routers, applications, resources, etc.). However, often times, the configurations, policies, etc., defined by a network operator are incorrect or not accurately reflected in the actual behavior of the network. For example, a network operator specifies a configuration A for one or more types of traffic but later finds out that the network is actually applying configuration B to that traffic or otherwise processing that traffic in a manner that is inconsistent with configuration A. This can be a result of many different causes, such as hardware errors, software bugs, varying priorities, configuration conflicts, misconfiguration of one or more settings, improper rule rendering by devices, unexpected errors or events, software upgrades, configuration changes, failures, etc. As another example, a network operator implements configuration C but one or more other configurations result in the network behaving in a manner that is inconsistent with the intent reflected by the implementation of configuration C. For example, such a situation can result when configuration C conflicts with other configurations in the network.

The approaches herein can provide network assurance by modeling various aspects of the network and/or performing consistency checks as well as other network assurance checks. The network assurance approaches herein can be implemented in various types of networks, including a private network, such as a local area network (LAN); an enterprise network; a standalone or traditional network, such as a data center network; a network including a physical or underlay layer and a logical or overlay layer, such as a VXLAN or SDN (e.g., Application Centric Infrastructure (ACI) or VMware NSX networks); etc.

Network models can be constructed for a network and implemented for network assurance. A network model can provide a representation of one or more aspects of a network, including, without limitation the network's policies, configurations, requirements, security, routing, topology, applications, hardware, filters, contracts, access control lists, infrastructure, etc. As will be further explained below, different types of models can be generated for a network.

Such models can be implemented to ensure that the behavior of the network will be consistent (or is consistent) with the intended behavior reflected through specific configurations (e.g., policies, settings, definitions, etc.) implemented by the network operator. Unlike traditional network monitoring, which involves sending and analyzing data packets and observing network behavior, network assurance can be performed through modeling without necessarily ingesting packet data or monitoring traffic or network behavior. This can result in foresight, insight, and hindsight: problems can be prevented before they occur, identified when they occur, and fixed immediately after they occur.

Thus, network assurance can involve modeling properties of the network to deterministically predict the behavior of the network. The network can be determined to be healthy if the model(s) indicate proper behavior (e.g., no inconsistencies, conflicts, errors, etc.). The network can be determined to be functional, but not fully healthy, if the modeling indicates proper behavior but some inconsistencies. The network can be determined to be non-functional and not healthy if the modeling indicates improper behavior and errors. If inconsistencies or errors are detected by the modeling, a detailed analysis of the corresponding model(s) can allow one or more underlying or root problems to be identified with great accuracy.

The modeling can consume numerous types of smart events which model a large amount of behavioral aspects of the network. Smart events can impact various aspects of the network, such as underlay services, overlay services, tenant connectivity, tenant security, tenant endpoint (EP) mobility, tenant policy, tenant routing, resources, etc.

Having described various aspects of network assurance, the disclosure now turns to a discussion of example network environments for network assurance.

FIG. 1A illustrates a diagram of an example Network Environment 100, such as a data center. The Network Environment 100 can include a Fabric 120 which can represent the physical layer or infrastructure (e.g., underlay) of the Network Environment 100. Fabric 120 can include Spines 102 (e.g., spine routers or switches) and Leafs 104 (e.g., leaf routers or switches) which can be interconnected for routing or switching traffic in the Fabric 120. Spines 102 can interconnect Leafs 104 in the Fabric 120, and Leafs 104 can connect the Fabric 120 to an overlay or logical portion of the Network Environment 100, which can include application services, servers, virtual machines, containers, endpoints, etc. Thus, network connectivity in the Fabric 120 can flow from Spines 102 to Leafs 104, and vice versa. The interconnections between Leafs 104 and Spines 102 can be redundant (e.g., multiple interconnections) to avoid a failure in routing. In some embodiments, Leafs 104 and Spines 102 can be fully connected, such that any given Leaf is connected to each of the Spines 102, and any given Spine is connected to each of the Leafs 104. Leafs 104 can be, for example, top-of-rack ("ToR") switches, aggregation switches, gateways, ingress and/or egress switches, provider edge devices, and/or any other type of routing or switching device.

Leafs 104 can be responsible for routing and/or bridging tenant or customer packets and applying network policies or rules. Network policies and rules can be driven by one or more Controllers 116, and/or implemented or enforced by one or more devices, such as Leafs 104. Leafs 104 can connect other elements to the Fabric 120. For example, Leafs 104 can connect Servers 106, Hypervisors 108, Virtual Machines (VMs) 110, Applications 112, Network Device 114, etc., with Fabric 120. Such elements can reside in one or more logical or virtual layers or networks, such as an overlay network. In some cases, Leafs 104 can encapsulate and decapsulate packets to and from such elements (e.g., Servers 106) in order to enable communications throughout Network Environment 100 and Fabric 120. Leafs 104 can also provide any other devices, services, tenants, or workloads with access to Fabric 120. In some cases, Servers 106 connected to Leafs 104 can similarly encapsulate and decapsulate packets to and from Leafs 104. For example, Servers 106 can include one or more virtual switches or routers or tunnel endpoints for tunneling packets between an overlay or logical layer hosted by, or connected to, Servers 106 and an underlay layer represented by Fabric 120 and accessed via Leafs 104.

Applications 112 can include software applications, services, containers, appliances, functions, service chains, etc. For example, Applications 112 can include a firewall, a database, a CDN server, an IDS/IPS, a deep packet inspection service, a message router, a virtual switch, etc. An application from Applications 112 can be distributed, chained, or hosted by multiple endpoints (e.g., Servers 106, VMs 110, etc.), or may run or execute entirely from a single endpoint.

VMs 110 can be virtual machines hosted by Hypervisors 108 or virtual machine managers running on Servers 106. VMs 110 can include workloads running on a guest operating system on a respective server. Hypervisors 108 can provide a layer of software, firmware, and/or hardware that creates, manages, and/or runs the VMs 110. Hypervisors 108 can allow VMs 110 to share hardware resources on Servers 106, and the hardware resources on Servers 106 to appear as multiple, separate hardware platforms. Moreover, Hypervisors 108 on Servers 106 can host one or more VMs 110.

In some cases, VMs 110 and/or Hypervisors 108 can be migrated to other Servers 106. Servers 106 can similarly be migrated to other locations in Network Environment 100. For example, a server connected to a specific leaf can be changed to connect to a different or additional leaf. Such configuration or deployment changes can involve modifications to settings, configurations and policies that are applied to the resources being migrated as well as other network components.

In some cases, one or more Servers 106, Hypervisors 108, and/or VMs 110 can represent or reside in a tenant or customer space. Tenant space can include workloads, services, applications, devices, networks, and/or resources that are associated with one or more clients or subscribers. Accordingly, traffic in Network Environment 100 can be routed based on specific tenant policies, spaces, agreements, configurations, etc. Moreover, addressing can vary between one or more tenants. In some configurations, tenant spaces can be divided into logical segments and/or networks and separated from logical segments and/or networks associated with other tenants. Addressing, policy, security and configuration information between tenants can be managed by Controllers 116, Servers 106, Leafs 104, etc.

Configurations in Network Environment 100 can be implemented at a logical level, a hardware level (e.g., physical), and/or both. For example, configurations can be implemented at a logical and/or hardware level based on endpoint or resource attributes, such as endpoint types and/or application groups or profiles, through a software-defined network (SDN) framework (e.g., Application-Centric Infrastructure (ACI) or VMWARE NSX). To illustrate, one or more administrators can define configurations at a logical level (e.g., application or software level) through Controllers 116, which can implement or propagate such configurations through Network Environment 100. In some examples, Controllers 116 can be Application Policy Infrastructure Controllers (APICs) in an ACI framework. In other examples, Controllers 116 can be one or more management components for associated with other SDN solutions, such as NSX Managers.

Such configurations can define rules, policies, priorities, protocols, attributes, objects, etc., for routing and/or classifying traffic in Network Environment 100. For example, such configurations can define attributes and objects for classifying and processing traffic based on Endpoint Groups (EPGs), Security Groups (SGs), VM types, bridge domains (BDs), virtual routing and forwarding instances (VRFs), tenants, priorities, firewall rules, etc. Other example network objects and configurations are further described below. Traffic policies and rules can be enforced based on tags, attributes, or other characteristics of the traffic, such as protocols associated with the traffic, EPGs associated with the traffic, SGs associated with the traffic, network address information associated with the traffic, etc. Such policies and rules can be enforced by one or more elements in Network Environment 100, such as Leafs 104, Servers 106, Hypervisors 108, Controllers 116, etc. As previously explained, Network Environment 100 can be configured according to one or more particular software-defined network (SDN) solutions, such as CISCO ACI or VMWARE NSX. These example SDN solutions are briefly described below.

ACI can provide an application-centric or policy-based solution through scalable distributed enforcement. ACI supports integration of physical and virtual environments under a declarative configuration model for networks, servers, services, security, requirements, etc. For example, the ACI framework implements EPGs, which can include a collection of endpoints or applications that share common configuration requirements, such as security, QoS, services, etc. Endpoints can be virtual/logical or physical devices, such as VMs, containers, hosts, or physical servers that are connected to Network Environment 100. Endpoints can have one or more attributes such as a VM name, guest OS name, a security tag, application profile, etc. Application configurations can be applied between EPGs, instead of endpoints directly, in the form of contracts. Leafs 104 can classify incoming traffic into different EPGs. The classification can be based on, for example, a network segment identifier such as a VLAN ID, VXLAN Network Identifier (VNID), NVGRE Virtual Subnet Identifier (VSID), MAC address, IP address, etc.

In some cases, classification in the ACI fabric can be implemented by Application Virtual Switches (AVS), which can run on a host, such as a server or switch. For example, an AVS can classify traffic based on specified attributes, and tag packets of different attribute EPGs with different identifiers, such as network segment identifiers (e.g., VLAN ID). Finally, Leafs 104 can tie packets with their attribute EPGs based on their identifiers and enforce policies, which can be implemented and/or managed by one or more Controllers 116. Leaf 104 can classify to which EPG the traffic from a host belongs and enforce policies accordingly.

Another example SDN solution is based on VMWARE NSX. With VMWARE NSX, hosts can run a distributed firewall (DFW) which can classify and process traffic. Consider a case where three types of VMs, namely, application, database and web VMs, are put into a single layer-2 network segment. Traffic protection can be provided within the network segment based on the VM type. For example, HTTP traffic can be allowed among web VMs, and disallowed between a web VM and an application or database VM. To classify traffic and implement policies, VMWARE NSX can implement security groups, which can be used to group the specific VMs (e.g., web VMs, application VMs, database VMs). DFW rules can be configured to implement policies for the specific security groups. To illustrate, in the context of the previous example, DFW rules can be configured to block HTTP traffic between web, application, and database security groups.

Returning now to FIG. 1A, Network Environment 100 can deploy different hosts via Leafs 104, Servers 106, Hypervisors 108, VMs 110, Applications 112, and Controllers 116, such as VMWARE ESXi hosts, WINDOWS HYPER-V hosts, bare metal physical hosts, etc. Network Environment 100 may interoperate with a variety of Hypervisors 108, Servers 106 (e.g., physical and/or virtual servers), SDN orchestration platforms, etc. Network Environment 100 may implement a declarative model to allow its integration with application design and holistic network policy.

Controllers 116 can provide centralized access to fabric information, application configuration, resource configuration, application-level configuration modeling for a software-defined network (SDN) infrastructure, integration with management systems or servers, etc. Controllers 116 can form a control plane that interfaces with an application plane via northbound APIs and a data plane via southbound APIs.

As previously noted, Controllers 116 can define and manage application-level model(s) for configurations in Network Environment 100. In some cases, application or device configurations can also be managed and/or defined by other components in the network. For example, a hypervisor or virtual appliance, such as a VM or container, can run a server or management tool to manage software and services in Network Environment 100, including configurations and settings for virtual appliances.

As illustrated above, Network Environment 100 can include one or more different types of SDN solutions, hosts, etc. For the sake of clarity and explanation purposes, various examples in the disclosure will be described with reference to an ACI framework, and Controllers 116 may be interchangeably referenced as controllers, APICs, or APIC controllers. However, it should be noted that the technologies and concepts herein are not limited to ACI solutions and may be implemented in other architectures and scenarios, including other SDN solutions as well as other types of networks which may not deploy an SDN solution.

Further, as referenced herein, the term "hosts" can refer to Servers 106 (e.g., physical or logical), Hypervisors 108, VMs 110, containers (e.g., Applications 112), etc., and can run or include any type of server or application solution. Non-limiting examples of "hosts" can include virtual switches or routers, such as distributed virtual switches (DVS), application virtual switches (AVS), vector packet processing (VPP) switches; VCENTER and NSX MANAGERS; bare metal physical hosts; HYPER-V hosts; VMs; DOCKER Containers; etc.

FIG. 1B illustrates another example of Network Environment 100. In this example, Network Environment 100 includes Endpoints 122 connected to Leafs 104 in Fabric 120. Endpoints 122 can be physical and/or logical or virtual entities, such as servers, clients, VMs, hypervisors, software containers, applications, resources, network devices, workloads, etc. For example, an Endpoint 122 can be an object that represents a physical device (e.g., server, client, switch, etc.), an application (e.g., web application, database application, etc.), a logical or virtual resource (e.g., a virtual switch, a virtual service appliance, a virtualized network function (VNF), a VM, a service chain, etc.), a container running a software resource (e.g., an application, an appliance, a VNF, a service chain, etc.), storage, a workload or workload engine, etc. Endpoints 122 can have an address (e.g., an identity), a location (e.g., host, network segment, virtual routing and forwarding (VRF) instance, domain, etc.), one or more attributes (e.g., name, type, version, patch level, OS name, OS type, etc.), a tag (e.g., security tag), a profile, etc.

Endpoints 122 can be associated with respective Logical Groups 118. Logical Groups 118 can be logical entities containing endpoints (physical and/or logical or virtual) grouped together according to one or more attributes, such as endpoint type (e.g., VM type, workload type, application type, etc.), one or more requirements (e.g., policy requirements, security requirements, QoS requirements, customer requirements, resource requirements, etc.), a resource name (e.g., VM name, application name, etc.), a profile, platform or operating system (OS) characteristics (e.g., OS type or name including guest and/or host OS, etc.), an associated network or tenant, one or more policies, a tag, etc. For example, a logical group can be an object representing a collection of endpoints grouped together. To illustrate, Logical Group 1 can contain client endpoints, Logical Group 2 can contain web server endpoints, Logical Group 3 can contain application server endpoints, Logical Group N can contain database server endpoints, etc. In some examples, Logical Groups 118 are EPGs in an ACI environment and/or other logical groups (e.g., SGs) in another SDN environment.

Traffic to and/or from Endpoints 122 can be classified, processed, managed, etc., based Logical Groups 118. For example, Logical Groups 118 can be used to classify traffic to or from Endpoints 122, apply policies to traffic to or from Endpoints 122, define relationships between Endpoints 122, define roles of Endpoints 122 (e.g., whether an endpoint consumes or provides a service, etc.), apply rules to traffic to or from Endpoints 122, apply filters or access control lists (ACLs) to traffic to or from Endpoints 122, define communication paths for traffic to or from Endpoints 122, enforce requirements associated with Endpoints 122, implement security and other configurations associated with Endpoints 122, etc.

In an ACI environment, Logical Groups 118 can be EPGs used to define contracts in the ACI. Contracts can include rules specifying what and how communications between EPGs take place. For example, a contract can define what provides a service, what consumes a service, and what policy objects are related to that consumption relationship. A contract can include a policy that defines the communication path and all related elements of a communication or relationship between endpoints or EPGs. For example, a Web EPG can provide a service that a Client EPG consumes, and that consumption can be subject to a filter (ACL) and a service graph that includes one or more services, such as firewall inspection services and server load balancing.

Figure 2A:
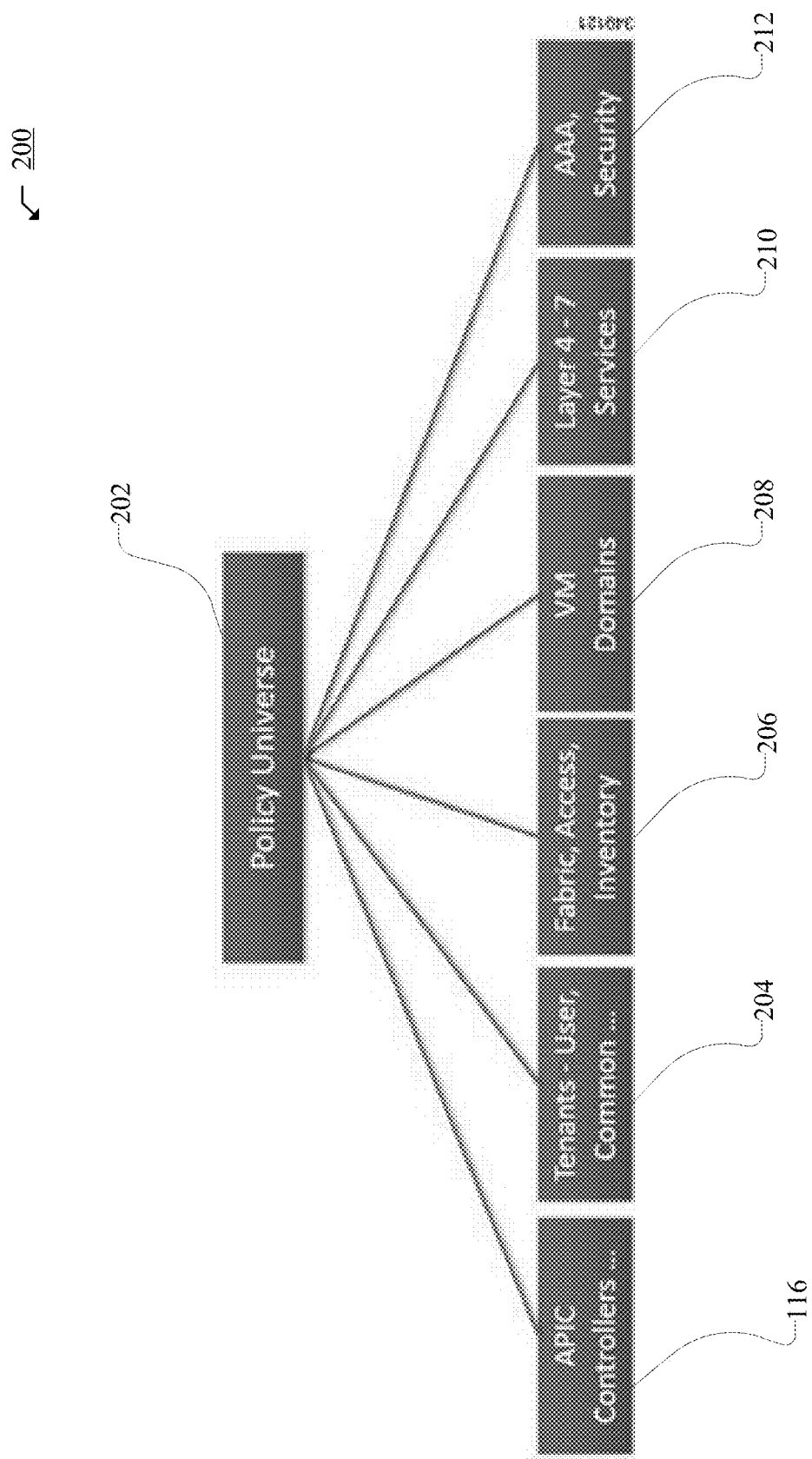
FIG. 2A illustrates an example object model for a network.

FIG. 2A illustrates a diagram of an example Management Information Model 200 for an SDN network, such as Network Environment 100. The following discussion of Management Information Model 200 references various terms which shall also be used throughout the disclosure. Accordingly, for clarity, the disclosure shall first provide below a list of terminology, which will be followed by a more detailed discussion of Management Information Model 200.

As used herein, an "Alias" can refer to a changeable name for a given object. Thus, even if the name of an object, once created, cannot be changed, the Alias can be a field that can be changed.

As used herein, the term "Aliasing" can refer to a rule (e.g., contracts, policies, configurations, etc.) that overlaps one or more other rules. For example, Contract 1 defined in a logical model of a network can be said to be aliasing Contract 2 defined in the logical model of the network if Contract 1 overlaps Contract 1. In this example, by aliasing Contract 2, Contract 1 may render Contract 2 redundant or inoperable. For example, if Contract 1 has a higher priority than Contract 2, such aliasing can render Contract 2 redundant based on Contract 1's overlapping and higher priority characteristics.

As used herein, the term "APIC" can refer to one or more controllers (e.g., Controllers 116) in an ACI framework. The APIC can provide a unified point of automation and management, policy programming, application deployment, health monitoring for an ACI multitenant fabric. The APIC can be implemented as a single controller, a distributed controller, or a replicated, synchronized, and/or clustered controller.

As used herein, the term "BDD" can refer to a binary decision tree. A binary decision tree can be a data structure representing functions, such as Boolean functions.

As used herein, the term "BD" can refer to a bridge domain. A bridge domain can be a set of logical ports that share the same flooding or broadcast characteristics. Like a virtual LAN (VLAN), bridge domains can span multiple devices. A bridge domain can be a L2 (Layer 2) construct.

As used herein, a "Consumer" can refer to an endpoint, resource, and/or EPG that consumes a service.

As used herein, a "Context" can refer to an L3 (Layer 3) address domain that allows multiple instances of a routing table to exist and work simultaneously. This increases functionality by allowing network paths to be segmented without using multiple devices. Non-limiting examples of a context or L3 address domain can include a Virtual Routing and Forwarding (VRF) instance, a private network, and so forth.

As used herein, the term "Contract" can refer to rules or configurations that specify what and how communications in a network are conducted (e.g., allowed, denied, filtered, processed, etc.). In an ACI network, contracts can specify how communications between endpoints and/or EPGs take place. In some examples, a contract can provide rules and configurations akin to an Access Control List (ACL).

As used herein, the term "Distinguished Name" (DN) can refer to a unique name that describes an object, such as an MO, and locates its place in Management Information Model 200. In some cases, the DN can be (or equate to) a Fully Qualified Domain Name (FQDN).

As used herein, the term "Endpoint Group" (EPG) can refer to a logical entity or object associated with a collection or group of endpoints as previously described with reference to FIG. 1B.

As used herein, the term "Filter" can refer to a parameter or configuration for allowing communications. For example, in a whitelist model where all communications are blocked by default, a communication must be given explicit permission to prevent such communication from being blocked. A filter can define permission(s) for one or more communications or packets. A filter can thus function similar to an ACL or Firewall rule. In some examples, a filter can be implemented in a packet (e.g., TCP/IP) header field, such as L3 protocol type, L4 (Layer 4) ports, and so on, which is used to allow inbound or outbound communications between endpoints or EPGs, for example.

As used herein, the term "L2 Out" can refer to a bridged connection. A bridged connection can connect two or more segments of the same network so that they can communicate. In an ACI framework, an L2 out can be a bridged (Layer 2) connection between an ACI fabric (e.g., Fabric 120) and an outside Layer 2 network, such as a switch.

As used herein, the term "L3 Out" can refer to a routed connection. A routed Layer 3 connection uses a set of protocols that determine the path that data follows in order to travel across networks from its source to its destination. Routed connections can perform forwarding (e.g., IP forwarding) according to a protocol selected, such as BGP (border gateway protocol), OSPF (Open Shortest Path First), EIGRP (Enhanced Interior Gateway Routing Protocol), etc.

As used herein, the term "Managed Object" (MO) can refer to an abstract representation of objects that are managed in a network (e.g., Network Environment 100). The objects can be concrete objects (e.g., a switch, server, adapter, etc.), or logical objects (e.g., an application profile, an EPG, a fault, etc.). The MOs can be network resources or elements that are managed in the network. For example, in an ACI environment, an MO can include an abstraction of an ACI fabric (e.g., Fabric 120) resource.

As used herein, the term "Management Information Tree" (MIT) can refer to a hierarchical management information tree containing the MOs of a system. For example, in ACI, the MIT contains the MOs of the ACI fabric (e.g., Fabric 120). The MIT can also be referred to as a Management Information Model (MIM), such as Management Information Model 200.

As used herein, the term "Policy" can refer to one or more specifications for controlling some aspect of system or network behavior. For example, a policy can include a named entity that contains specifications for controlling some aspect of system behavior. To illustrate, a Layer 3 Outside Network Policy can contain the BGP protocol to enable BGP routing functions when connecting Fabric 120 to an outside Layer 3 network.

As used herein, the term "Profile" can refer to the configuration details associated with a policy. For example, a profile can include a named entity that contains the configuration details for implementing one or more instances of a policy. To illustrate, a switch node profile for a routing policy can contain the switch-specific configuration details to implement the BGP routing protocol.

As used herein, the term "Provider" refers to an object or entity providing a service. For example, a provider can be an EPG that provides a service.

As used herein, the term "Subject" refers to one or more parameters in a contract for defining communications. For example, in ACI, subjects in a contract can specify what information can be communicated and how. Subjects can function similar to ACLs.

As used herein, the term "Tenant" refers to a unit of isolation in a network. For example, a tenant can be a secure and exclusive virtual computing environment. In ACI, a tenant can be a unit of isolation from a policy perspective, but does not necessarily represent a private network. Indeed, ACI tenants can contain multiple private networks (e.g., VRFs). Tenants can represent a customer in a service provider setting, an organization or domain in an enterprise setting, or just a grouping of policies.

As used herein, the term "VRF" refers to a virtual routing and forwarding instance. The VRF can define a Layer 3 address domain that allows multiple instances of a routing table to exist and work simultaneously. This increases functionality by allowing network paths to be segmented without using multiple devices. Also known as a context or private network.

Having described various terms used herein, the disclosure now returns to a discussion of Management Information Model (MIM) 200 in FIG. 2A. As previously noted, MIM 200 can be a hierarchical management information tree or MIT. Moreover, MIM 200 can be managed and processed by Controllers 116, such as APICs in an ACI. Controllers 116 can enable the control of managed resources by presenting their manageable characteristics as object properties that can be inherited according to the location of the object within the hierarchical structure of the model.

The hierarchical structure of MIM 200 starts with Policy Universe 202 at the top (Root) and contains parent and child nodes 116, 204, 206, 208, 210, 212. Nodes 116, 202, 204, 206, 208, 210, 212 in the tree represent the managed objects (MOs) or groups of objects. Each object in the fabric (e.g., Fabric 120) has a unique distinguished name (DN) that describes the object and locates its place in the tree. The Nodes 116, 202, 204, 206, 208, 210, 212 can include the various MOs, as described below, which contain policies that govern the operation of the system.

Controllers 116

Controllers 116 (e.g., APIC controllers) can provide management, policy programming, application deployment, and health monitoring for Fabric 120.

Node 204

Node 204 includes a tenant container for policies that enable an administrator to exercise domain-based access control. Non-limiting examples of tenants can include:

User tenants defined by the administrator according to the needs of users. They contain policies that govern the operation of resources such as applications, databases, web servers, network-attached storage, virtual machines, and so on.

The common tenant is provided by the system but can be configured by the administrator. It contains policies that govern the operation of resources accessible to all tenants, such as firewalls, load balancers, Layer 4 to Layer 7 services, intrusion detection appliances, and so on.

The infrastructure tenant is provided by the system but can be configured by the administrator. It contains policies that govern the operation of infrastructure resources such as the fabric overlay (e.g., VXLAN). It also enables a fabric provider to selectively deploy resources to one or more user tenants. Infrastructure tenant polices can be configurable by the administrator.

The management tenant is provided by the system but can be configured by the administrator. It contains policies that govern the operation of fabric management functions used for in-band and out-of-band configuration of fabric nodes. The management tenant contains a private out-of-bound address space for the Controller/Fabric internal communications that is outside the fabric data path that provides access through the management port of the switches. The management tenant enables discovery and automation of communications with virtual machine controllers.

Node 206

Node 206 can contain access policies that govern the operation of switch access ports that provide connectivity to resources such as storage, compute, Layer 2 and Layer 3 (bridged and routed) connectivity, virtual machine hypervisors, Layer 4 to Layer 7 devices, and so on. If a tenant requires interface configurations other than those provided in the default link, Cisco Discovery Protocol (CDP), Link Layer Discovery Protocol (LLDP), Link Aggregation Control rotocol (LACP), or Spanning Tree Protocol (STP), an administrator can configure access policies to enable such configurations on the access ports of Leafs 104.

Node 206 can contain fabric policies that govern the operation of the switch fabric ports, including such functions as Network Time Protocol (NTP) server synchronization, Intermediate System-to-Intermediate System Protocol (IS-IS), Border Gateway Protocol (BGP) route reflectors, Domain Name System (DNS) and so on. The fabric MO contains objects such as power supplies, fans, chassis, and so on.

Node 208

Node 208 can contain VM domains that group VM controllers with similar networking policy requirements. VM controllers can share virtual space (e.g., VLAN or VXLAN space) and application EPGs. Controllers 116 communicate with the VM controller to publish network configurations such as port groups that are then applied to the virtual workloads.

Node 210

Node 210 can contain Layer 4 to Layer 7 service integration life cycle automation framework that enables the system to dynamically respond when a service comes online or goes offline. Policies can provide service device package and inventory management functions.

Node 212

Node 212 can contain access, authentication, and accounting (AAA) policies that govern user privileges, roles, and security domains of Fabric 120.

The hierarchical policy model can fit well with an API, such as a REST API interface. When invoked, the API can read from or write to objects in the MIT. URLs can map directly into distinguished names that identify objects in the MIT. Data in the MIT can be described as a self-contained structured tree text document encoded in XML or JSON, for example.

Figure 2B:
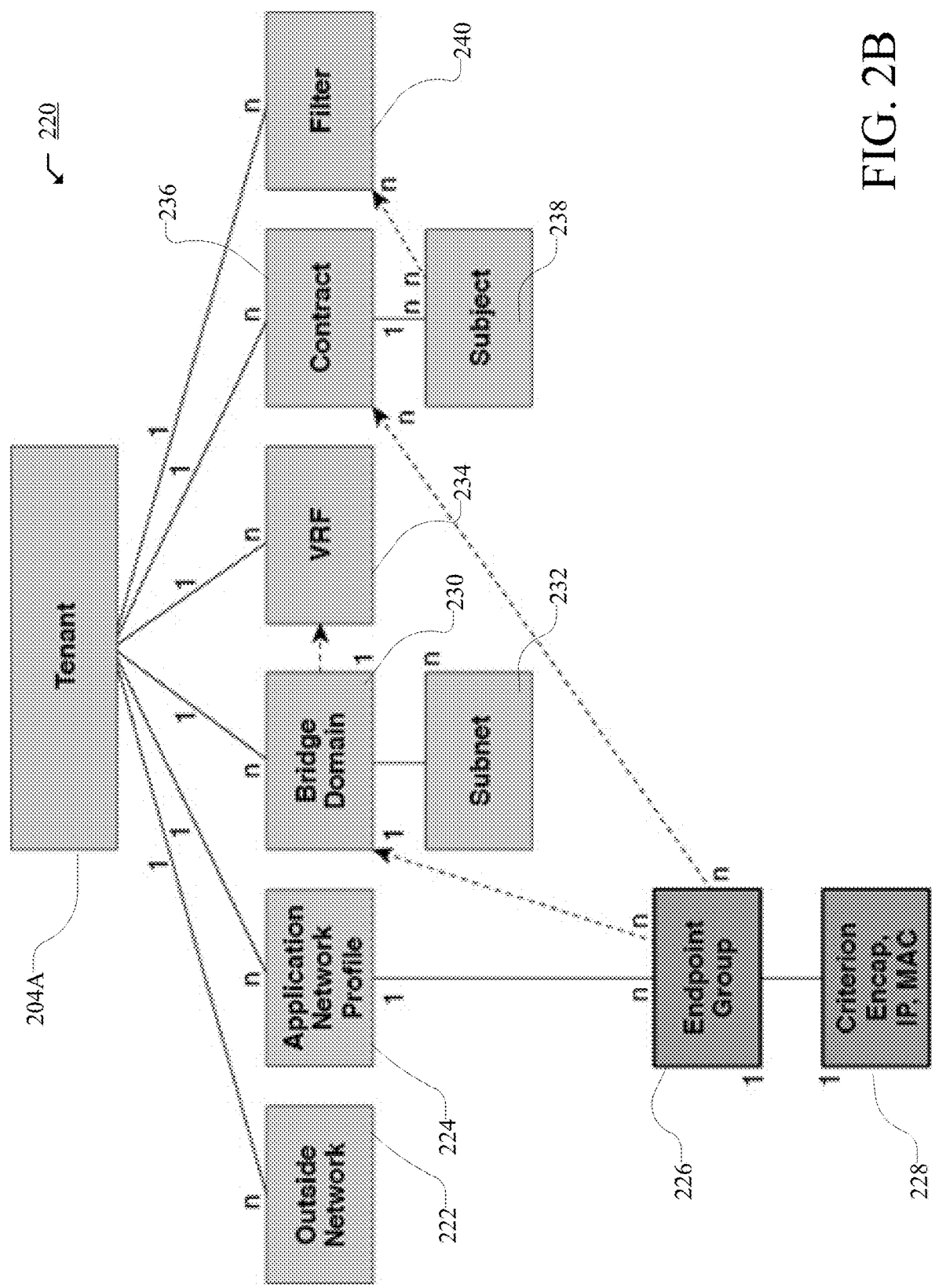
FIG. 2B illustrates an example object model for a tenant object in the example object model from FIG. 2A.

FIG. 2B illustrates an example object model 220 for a tenant portion of MIM 200. As previously noted, a tenant is a logical container for application policies that enable an administrator to exercise domain-based access control. A tenant thus represents a unit of isolation from a policy perspective, but it does not necessarily represent a private network. Tenants can represent a customer in a service provider setting, an organization or domain in an enterprise setting, or just a convenient grouping of policies. Moreover, tenants can be isolated from one another or can share resources.

Tenant portion 204A of MIM 200 can include various entities, and the entities in Tenant Portion 204A can inherit policies from parent entities. Non-limiting examples of entities in Tenant Portion 204A can include Filters 240, Contracts 236, Outside Networks 222, Bridge Domains 230, VRF Instances 234, and Application Profiles 224.

Bridge Domains 230 can include Subnets 232. Contracts 236 can include Subjects 238. Application Profiles 224 can contain one or more EPGs 226. Some applications can contain multiple components. For example, an e-commerce application could require a web server, a database server, data located in a storage area network, and access to outside resources that enable financial transactions. Application Profile 224 contains as many (or as few) EPGs as necessary that are logically related to providing the capabilities of an application.

EPG 226 can be organized in various ways, such as based on the application they provide, the function they provide (such as infrastructure), where they are in the structure of the data center (such as DMZ), or whatever organizing principle that a fabric or tenant administrator chooses to use.

EPGs in the fabric can contain various types of EPGs, such as application EPGs, Layer 2 external outside network instance EPGs, Layer 3 external outside network instance EPGs, management EPGs for out-of-band or in-band access, etc. EPGs 226 can also contain Attributes 228, such as encapsulation-based EPGs, IP-based EPGs, or MAC-based EPGs.

As previously mentioned, EPGs can contain endpoints (e.g., EPs 122) that have common characteristics or attributes, such as common policy requirements (e.g., security, virtual machine mobility (VMM), QoS, or Layer 4 to Layer 7 services). Rather than configure and manage endpoints individually, they can be placed in an EPG and managed as a group.

Policies apply to EPGs, including the endpoints they contain. An EPG can be statically configured by an administrator in Controllers 116, or dynamically configured by an automated system such as VCENTER or OPENSTACK.

To activate tenant policies in Tenant Portion 204A, fabric access policies should be configured and associated with tenant policies. Access policies enable an administrator to configure other network configurations, such as port channels and virtual port channels, protocols such as LLDP, CDP, or LACP, and features such as monitoring or diagnostics.

Figure 2C:
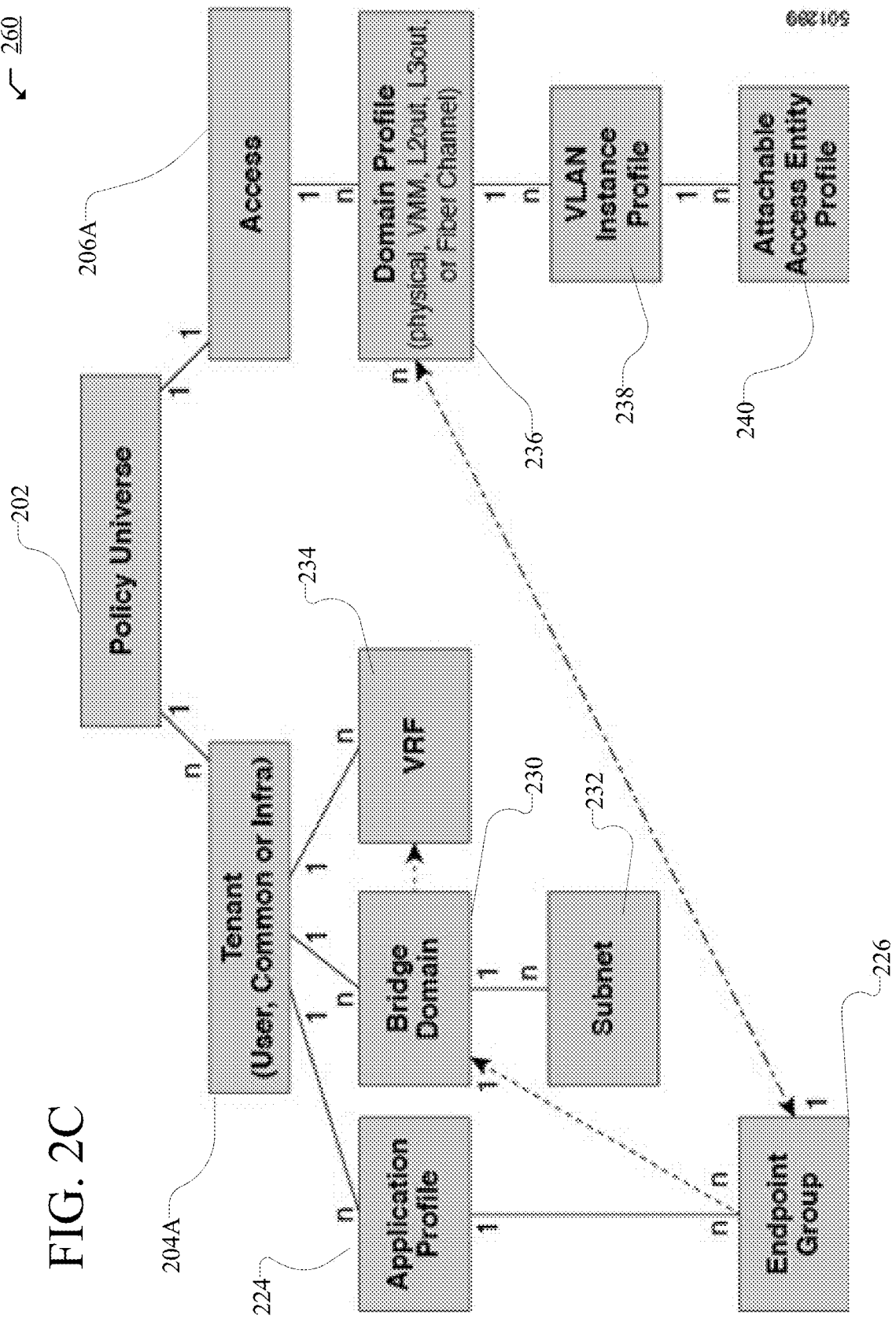
FIG. 2C illustrates an example association of various objects in the example object model from FIG. 2A.

FIG. 2C illustrates an example Association 260 of tenant entities and access entities in MIM 200. Policy Universe 202 contains Tenant Portion 204A and Access Portion 206A. Thus, Tenant Portion 204A and Access Portion 206A are associated through Policy Universe 202.

Access Portion 206A can contain fabric and infrastructure access policies. Typically, in a policy model, EPGs are coupled with VLANs. For traffic to flow, an EPG is deployed on a leaf port with a VLAN in a physical, VMM, L2 out, L3 out, or Fiber Channel domain, for example.

Access Portion 206A thus contains Domain Profile 236 which can define a physical, VMM, L2 out, L3 out, or Fiber Channel domain, for example, to be associated to the EPGs. Domain Profile 236 contains VLAN Instance Profile 238 (e.g., VLAN pool) and Attacheable Access Entity Profile (AEP) 240, which are associated directly with application EPGs. The AEP 240 deploys the associated application EPGs to the ports to which it is attached, and automates the task of assigning VLANs. While a large data center can have thousands of active VMs provisioned on hundreds of VLANs, Fabric 120 can automatically assign VLAN IDs from VLAN pools. This saves time compared with trunking down VLANs in a traditional data center.

Figure 2D:
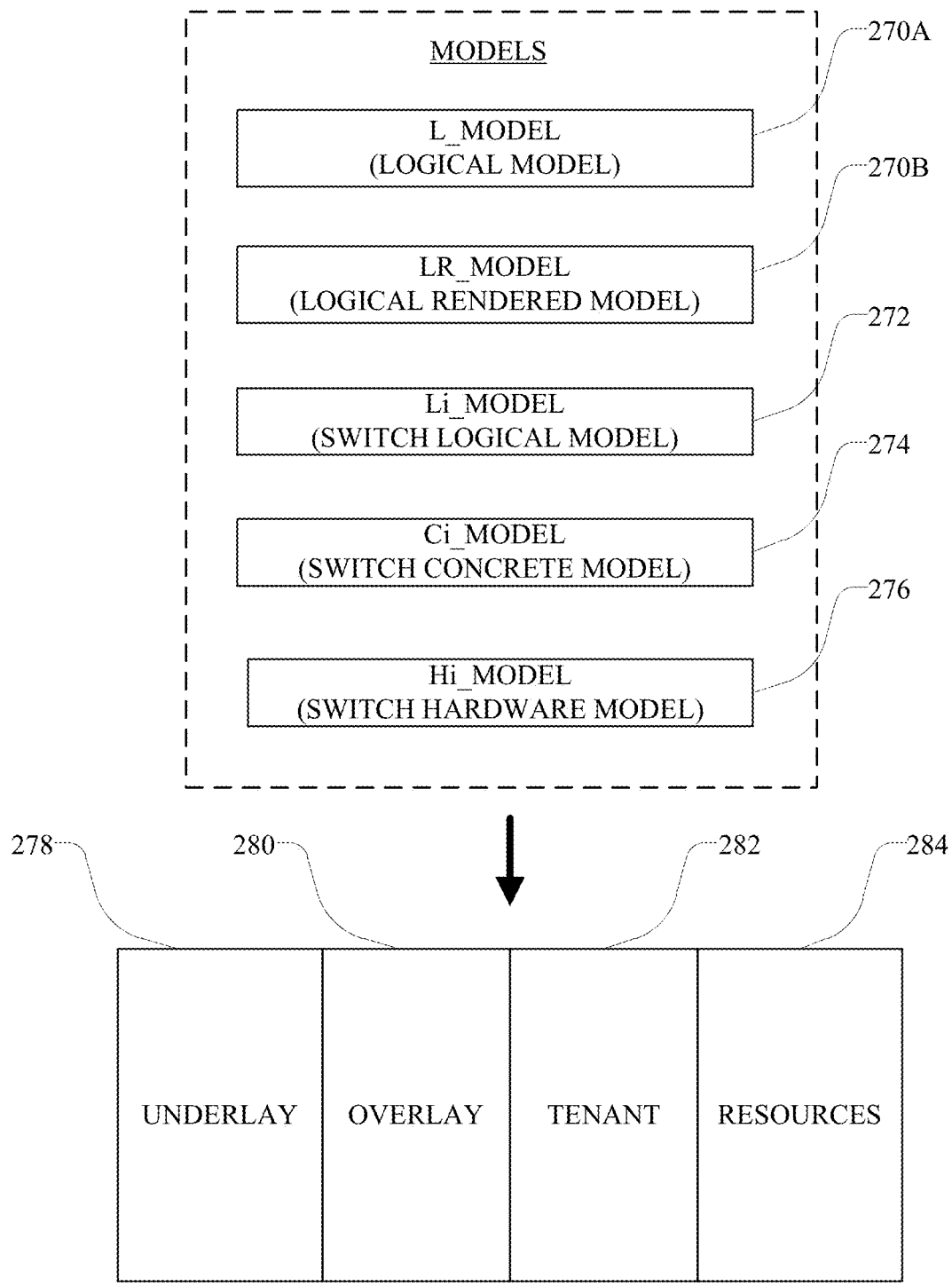
FIG. 2D illustrates a schematic diagram of example models for implementing the example object model from FIG. 2A.

FIG. 2D illustrates a schematic diagram of example models for implementing MIM 200. The network assurance models can include L_Model 270A (Logical Model), LR_Model 270B (Logical Rendered Model or Logical Runtime Model), Li_Model 272 (Logical Model for i), Ci_Model 274 (Concrete model for i), and Hi_Model 276 (Hardware model or TCAM Model for i).

L_Model 270A is the logical representation of the objects and their relationships in MIM 200. L_Model 270A can be generated by Controllers 116 based on configurations entered in Controllers 116 for the network, and thus represents the configurations of the network at Controllers 116. This is the declaration of the "end-state" expression that is desired when the elements of the network entities (e.g., applications) are connected and Fabric 120 is provisioned by Controllers 116. In other words, because L_Model 270A represents the configurations entered in Controllers 116, including the objects and relationships in MIM 200, it can also reflect the "intent" of the administrator: how the administrator wants the network and network elements to behave.

LR_Model 270B is the abstract model expression that Controllers 116 (e.g., APICs in ACI) resolve from L_Model 270A. LR_Model 270B can thus provide the elemental configuration components that would be delivered to the physical infrastructure (e.g., Fabric 120) to execute one or more policies. For example, LR_Model 270B can be delivered to Leafs 104 in Fabric 120 to configure Leafs 104 for communication with attached Endpoints 122.

Li_Model 272 is a switch-level or switch-specific model obtained from Logical Model 270A and/or Resolved Model 270B. For example, Li_Model 272 can represent the portion of L_Model 270A and/or LR_Model 270B pertaining to a specific switch or router i. To illustrate, Li_Model 272 $L_1$ can represent the portion of L_Model 270A and/or LR_Model 270B pertaining to Leaf 1 (104). Thus, Li_Model 272 can be generated from L_Model 270A and/or LR_Model 270B for one or more switch or routers (e.g., Leafs 104 and/or Spines 102) on Fabric 120.

Ci_Model 274 is the actual in-state configuration at the individual fabric member i (e.g., switch i). In other words, Ci_Model 274 is a switch-level or switch-specific model that is based on Li_Model 272. For example, Controllers 116 can deliver Li_Model 272 to Leaf 1 (104). Leaf 1 (104) can take Li_Model 272, which can be specific to Leaf 1 (104), and render the policies in Li_Model 272 into a concrete model, Ci_Model 274, that runs on Leaf 1 (104). Leaf 1 (104) can render Li_Model 272 via the OS on Leaf 1 (104), for example. Thus, Ci_Model 274 can be analogous to compiled software, as it is the form of Li_Model 272 that the switch OS at Leaf 1 (104) can execute.

Hi_Model 276 is also a switch-level or switch-specific model for switch i, but is based on Ci_Model 274 for switch i. Hi_Model 276 is the actual configuration (e.g., rules) stored or rendered on the hardware or memory (e.g., TCAM memory) at the individual fabric member i (e.g., switch i). For example, Hi_Model 276 can represent the configurations (e.g., rules) which Leaf 1 (104) stores or renders on the hardware (e.g., TCAM memory) of Leaf 1 (104) based on Ci_Model 274 at Leaf 1 (104). The switch OS at Leaf 1 (104) can render or execute Ci_Model 274, and Leaf 1 (104) can store or render the configurations from Ci Model in storage, such as the memory or TCAM at Leaf 1 (104). The configurations from Hi_Model 276 stored or rendered by Leaf 1 (104) represent the configurations that will be implemented by Leaf 1 (104) when processing traffic.

While Models 272, 274, 276 are shown as device-specific models, similar models can be generated or aggregated for a collection of fabric members (e.g., Leafs 104 and/or Spines 102) in Fabric 120. When combined, device-specific models, such as Model 272, Model 274, and/or Model 276, can provide a representation of Fabric 120 that extends beyond a particular device. For example, in some cases, Li_Model 272, Ci Model 272, and/or Hi Model 272 associated with some or all individual fabric members (e.g., Leafs 104 and Spines 102) can be combined or aggregated to generate one or more aggregated models based on the individual fabric members.

As referenced herein, the terms H Model, T Model, and TCAM Model can be used interchangeably to refer to a hardware model, such as Hi_Model 276. For example, Ti Model, Hi Model and TCAMi Model may be used interchangeably to refer to Hi_Model 276.

Models 270A, 270B, 272, 274, 276 can provide representations of various aspects of the network or various configuration stages for MIM 200. For example, one or more of Models 270A, 270B, 272, 274, 276 can be used to generate Underlay Model 278 representing one or more aspects of Fabric 120 (e.g., underlay topology, routing, etc.), Overlay Model 280 representing one or more aspects of the overlay or logical segment(s) of Network Environment 100 (e.g., COOP, MPBGP, tenants, VRFs, VLANs, VXLANs, virtual applications, VMs, hypervisors, virtual switching, etc.), Tenant Model 282 representing one or more aspects of Tenant portion 204A in MIM 200 (e.g., security, forwarding, service chaining, QoS, VRFs, BDs, Contracts, Filters, EPGs, subnets, etc.), Resources Model 284 representing one or more resources in Network Environment 100 (e.g., storage, computing, VMs, port channels, physical elements, etc.), etc.

In general, L_Model 270A can be the high-level expression of what exists in the LR_Model 270B, which should be present on the concrete devices as Ci_Model 274 and Hi_Model 276 expression. If there is any gap between the models, there may be inconsistent configurations or problems.

Figure 3A:
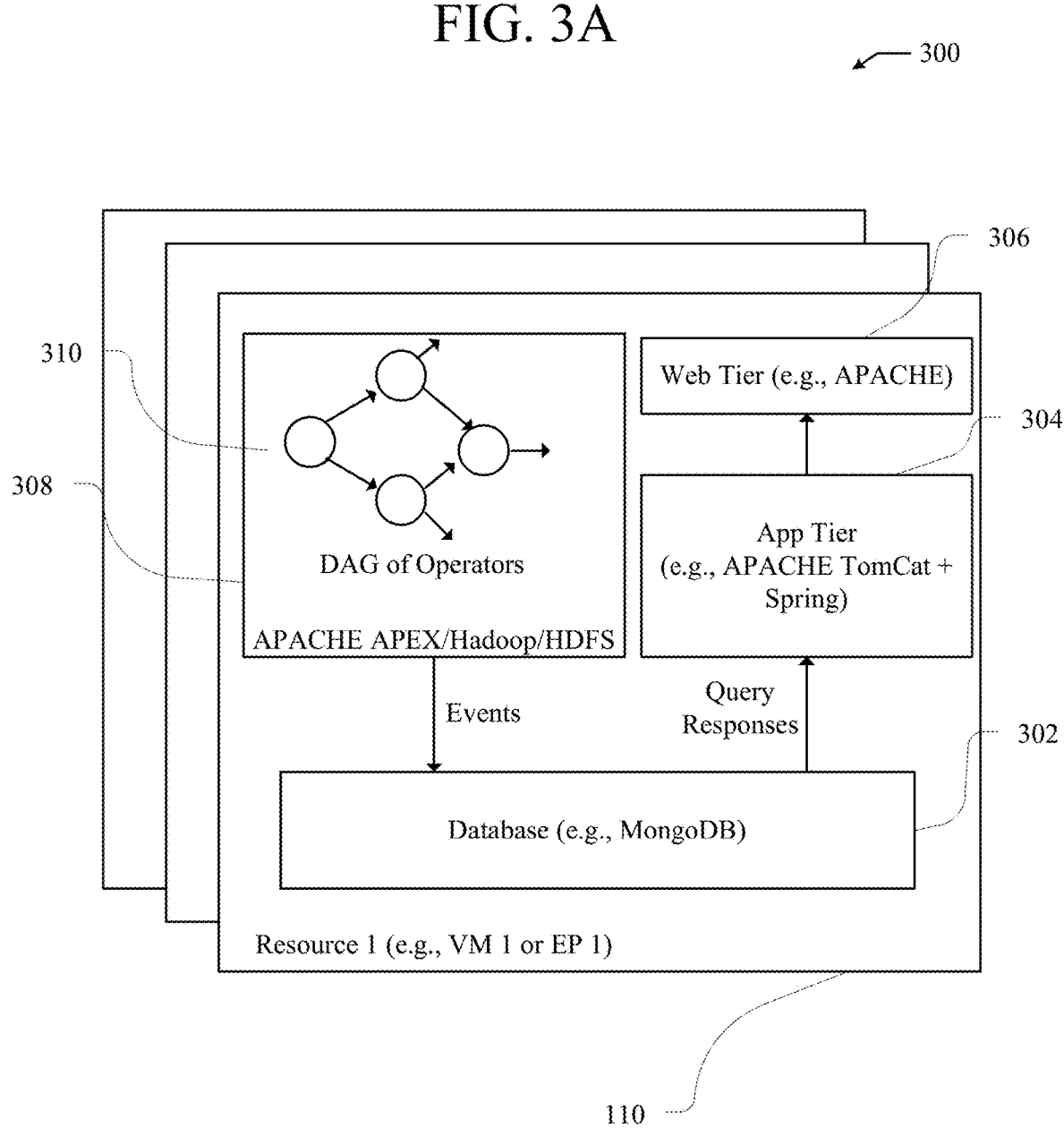
FIG. 3A illustrates an example network assurance appliance.

FIG. 3A illustrates a diagram of an example Assurance Appliance 300 for network assurance. In this example, Assurance Appliance 300 can include k VMs 110 operating in cluster mode. VMs are used in this example for explanation purposes. However, it should be understood that other configurations are also contemplated herein, such as use of containers, bare metal devices, Endpoints 122, or any other physical or logical systems. Moreover, while FIG. 3A illustrates a cluster mode configuration, other configurations are also contemplated herein, such as a single mode configuration (e.g., single VM, container, or server) or a service chain for example.

Assurance Appliance 300 can run on one or more Servers 106, VMs 110, Hypervisors 108, EPs 122, Leafs 104, Controllers 116, or any other system or resource. For example, Assurance Appliance 300 can be a logical service or application running on one or more VMs 110 in Network Environment 100.

The Assurance Appliance 300 can include Data Framework 308, which can be based on, for example, APACHE APEX and HADOOP. In some cases, assurance checks can be written as individual operators that reside in Data Framework 308. This enables a natively horizontal scale-out architecture that can scale to arbitrary number of switches in Fabric 120 (e.g., ACI fabric).

Assurance Appliance 300 can poll Fabric 120 at a configurable periodicity (e.g., an epoch). The analysis workflow can be setup as a DAG (Directed Acyclic Graph) of Operators 310, where data flows from one operator to another and eventually results are generated and persisted to Database 302 for each interval (e.g., each epoch).

The north-tier implements API Server (e.g., APACHE Tomcat and Spring framework) 304 and Web Server 306. A graphical user interface (GUI) interacts via the APIs exposed to the customer. These APIs can also be used by the customer to collect data from Assurance Appliance 300 for further integration into other tools.

Operators 310 in Data Framework 308 (e.g., APEX/Hadoop) can together support assurance operations. Below are non-limiting examples of assurance operations that can be performed by Assurance Appliance 300 via Operators 310.

Security Policy Adherence

Assurance Appliance 300 can check to make sure the configurations or specification from L_Model 270A, which may reflect the user's intent for the network, including for example the security policies and customer-configured contracts, are correctly implemented and/or rendered in Li_Model 272, Ci_Model 274, and Hi_Model 276, and thus properly implemented and rendered by the fabric members (e.g., Leafs 104), and report any errors, contract violations, or irregularities found.

Static Policy Analysis

Assurance Appliance 300 can check for issues in the specification of the user's intent or intents (e.g., identify contradictory or conflicting policies in L_Model 270A).

TCAM Utilization

TCAM is a scarce resource in the fabric (e.g., Fabric 120). However, Assurance Appliance 300 can analyze the TCAM utilization by the network data (e.g., Longest Prefix Match (LPM) tables, routing tables, VLAN tables, BGP updates, etc.), Contracts, Logical Groups 118 (e.g., EPGs), Tenants, Spines 102, Leafs 104, and other dimensions in Network Environment 100 and/or objects in MIM 200, to provide a network operator or user visibility into the utilization of this scarce resource. This can greatly help for planning and other optimization purposes.

Endpoint Checks

Assurance Appliance 300 can validate that the fabric (e.g. fabric 120) has no inconsistencies in the Endpoint information registered (e.g., two leafs announcing the same endpoint, duplicate subnets, etc.), among other such checks.

Tenant Routing Checks

Assurance Appliance 300 can validate that BDs, VRFs, subnets (both internal and external), VLANs, contracts, filters, applications, EPGs, etc., are correctly programmed.

Infrastructure Routing

Assurance Appliance 300 can validate that infrastructure routing (e.g., IS-IS protocol) has no convergence issues leading to black holes, loops, flaps, and other problems.

MP-BGP Route Reflection Checks

The network fabric (e.g., Fabric 120) can interface with other external networks and provide connectivity to them via one or more protocols, such as Border Gateway Protocol (BGP), Open Shortest Path First (OSPF), etc. The learned routes are advertised within the network fabric via, for example, MP-BGP. These checks can ensure that a route reflection service via, for example, MP-BGP (e.g., from Border Leaf) does not have health issues.

Logical Lint and Real-time Change Analysis

Assurance Appliance 300 can validate rules in the specification of the network (e.g., L_Model 270A) are complete and do not have inconsistencies or other problems. MOs in the MIM 200 can be checked by Assurance Appliance 300 through syntactic and semantic checks performed on L_Model 270A and/or the associated configurations of the MOs in MIM 200. Assurance Appliance 300 can also verify that unnecessary, stale, unused or redundant configurations, such as contracts, are removed.

Figure 3B:
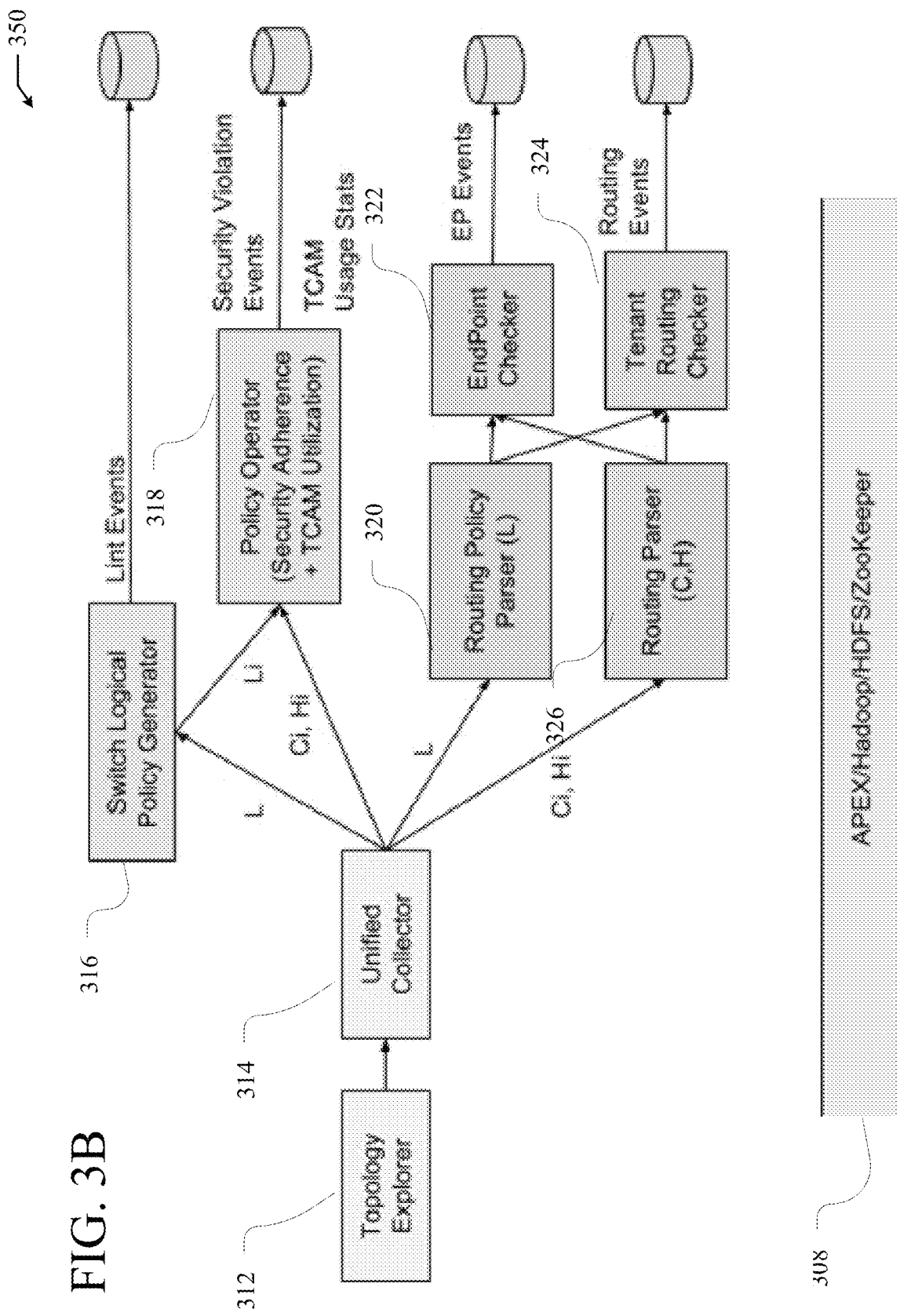
FIG. 3B illustrates an example system for network assurance.

FIG. 3B illustrates an architectural diagram of an example system 350 for network assurance. In some cases, system 350 can correspond to the DAG of Operators 310 previously discussed with respect to FIG. 3A In this example, Topology Explorer 312 communicates with Controllers 116 (e.g., APIC controllers) in order to discover or otherwise construct a comprehensive topological view of Fabric 120 (e.g., Spines 102, Leafs 104, Controllers 116, Endpoints 122, and any other components as well as their interconnections). While various architectural components are represented in a singular, boxed fashion, it is understood that a given architectural component, such as Topology Explorer 312, can correspond to one or more individual Operators 310 and may include one or more nodes or endpoints, such as one or more servers, VMs, containers, applications, service functions (e.g., functions in a service chain or virtualized network function), etc.

Topology Explorer 312 is configured to discover nodes in Fabric 120, such as Controllers 116, Leafs 104, Spines 102, etc. Topology Explorer 312 can additionally detect a majority election performed amongst Controllers 116, and determine whether a quorum exists amongst Controllers 116. If no quorum or majority exists, Topology Explorer 312 can trigger an event and alert a user that a configuration or other error exists amongst Controllers 116 that is preventing a quorum or majority from being reached. Topology Explorer 312 can detect Leafs 104 and Spines 102 that are part of Fabric 120 and publish their corresponding out-of-band management network addresses (e.g., IP addresses) to downstream services. This can be part of the topological view that is published to the downstream services at the conclusion of Topology Explorer's 312 discovery epoch (e.g., 5 minutes, or some other specified interval).

Unified Collector 314 can receive the topological view from Topology Explorer 312 and use the topology information to collect information for network assurance from Fabric 120. Such information can include L_Model 270A and/or LR_Model 270B from Controllers 116, switch software configurations (e.g., Ci_Model 274) from Leafs 104 and/or Spines 102, hardware configurations (e.g., Hi_Model 276) from Leafs 104 and/or Spines 102, etc. Unified Collector 314 can collect Ci_Model 274 and Hi_Model 276 from individual fabric members (e.g., Leafs 104 and Spines 102).

Unified Collector 314 can poll the devices that Topology Explorer 312 discovers in order to collect data from Fabric 120 (e.g., from the constituent members of the fabric). Unified Collector 314 can collect the data using interfaces exposed by Controller 116 and/or switch software (e.g., switch OS), including, for example, a Representation State Transfer (REST) Interface and a Secure Shell (SSH) Interface.

In some cases, Unified Collector 314 collects L_Model 270A, LR_Model 270B, and/or Ci_Model 274 via a REST API, and the hardware information (e.g., configurations, tables, fabric card information, rules, routes, etc.) via SSH using utilities provided by the switch software, such as virtual shell (VSH or VSHELL) for accessing the switch command-line interface (CLI) or VSH_LC shell for accessing runtime state of the line card.

Unified Collector 314 can poll other information from Controllers 116, including: topology information, tenant forwarding/routing information, tenant security policies, contracts, interface policies, physical domain or VMM domain information, OOB (out-of-band) management IP's of nodes in the fabric, etc.

Unified Collector 314 can also poll other information from Leafs 104 and Spines 102, such as: Ci Models 274 for VLANs, BDs, security policies, Link Layer Discovery Protocol (LLDP) connectivity information of Leafs 104 and/or Spines 102, endpoint information from EPM/COOP, fabric card information from Spines 102, routing information base (RIB) tables, forwarding information base (FIB) tables from Leafs 104 and/or Spines 102, security group hardware tables (e.g., TCAM tables) from switches, etc.

Assurance Appliance 300 can run one or more instances of Unified Collector 314. For example, Assurance Appliance 300 can run one, two, three, or more instances of Unified Collector 314. The task of data collecting for each node in the topology (e.g., Fabric 120 including Spines 102, Leafs 104, Controllers 116, etc.) can be sharded or load balanced, to a unique instance of Unified Collector 314. Data collection across the nodes can thus be performed in parallel by one or more instances of Unified Collector 314. Within a given node, commands and data collection can be executed serially. Assurance Appliance 300 can control the number of threads used by each instance of Unified Collector 314 to poll data from Fabric 120.

Data collected by Unified Collector 314 can be compressed and sent to downstream services. In some examples, Unified Collector 314 can collect data in an online fashion or real-time fashion, and send the data downstream, as it is collected, for further analysis. In some examples, Unified Collector 314 can collect data in an offline fashion, and compile the data for later analysis or transmission.

Assurance Appliance 300 can contact Controllers 116, Spines 102, Leafs 104, and other nodes to collect various types of data. In some scenarios, Assurance Appliance 300 may experience a failure (e.g., connectivity problem, hardware or software error, etc.) that prevents it from being able to collect data for a period of time. Assurance Appliance 300 can handle such failures seamlessly, and generate events based on such failures.

Switch Logical Policy Generator 316 can receive L_Model 270A and/or LR_Model 270B from Unified Collector 314 and calculate Li_Model 272 for each network device i (e.g., switch i) in Fabric 120. For example, Switch Logical Policy Generator 316 can receive L_Model 270A and/or LR_Model 270B and generate Li_Model 272 by projecting a logical model for each individual node i (e.g., Spines 102 and/or Leafs 104) in Fabric 120. Switch Logical Policy Generator 316 can generate Li_Model 272 for each switch in Fabric 120, thus creating a switch logical model based on L_Model 270A for each switch.

Switch Logical Configuration Generator 316 can also perform change analysis and generate lint events or records for problems discovered in L_Model 270A and/or LR_Model 270B. The lint events or records can be used to generate alerts for a user or network operator.

Policy Operator 318 can receive Ci_Model 274 and Hi_Model 276 for each switch from Unified Collector 314, and Li_Model 272 for each switch from Switch Logical Policy Generator 316, and perform assurance checks and analysis (e.g., security adherence checks, TCAM utilization analysis, etc.) based on Ci_Model 274, Hi_Model 276, and Li_Model 272. Policy Operator 318 can perform assurance checks on a switch-by-switch basis by comparing one or more of the models.

Returning to Unified Collector 314, Unified Collector 314 can also send L_Model 270A and/or LR_Model 270B to Routing Policy Parser 320, and Ci_Model 274 and Hi_Model 276 to Routing Parser 326.

Routing Policy Parser 320 can receive L_Model 270A and/or LR_Model 270B and parse the model(s) for information that may be relevant to downstream operators, such as Endpoint Checker 322 and Tenant Routing Checker 324. Similarly, Routing Parser 326 can receive Ci_Model 274 and Hi_Model 276 and parse each model for information for downstream operators, Endpoint Checker 322 and Tenant Routing Checker 324.

After Ci_Model 274, Hi_Model 276, L_Model 270A and/or LR_Model 270B are parsed, Routing Policy Parser 320 and/or Routing Parser 326 can send cleaned-up protocol buffers (Proto Buffs) to the downstream operators, Endpoint Checker 322 and Tenant Routing Checker 324. Endpoint Checker 322 can then generate events related to Endpoint violations, such as duplicate IPs, APIPA, etc., and Tenant Routing Checker 324 can generate events related to the deployment of BDs, VRFs, subnets, routing table prefixes, etc.

Figure 3C:
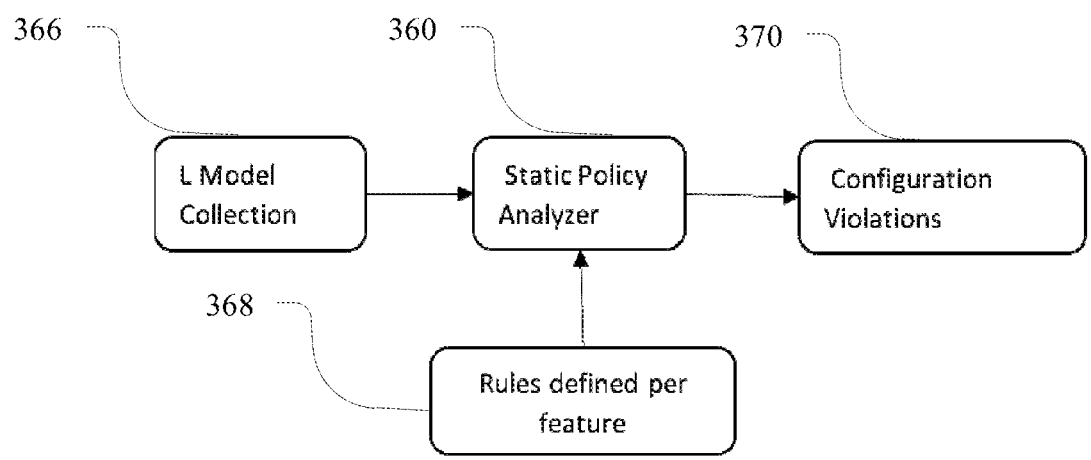
FIG. 3C illustrates a schematic diagram of an example system for static policy analysis in a network.

FIG. 3C illustrates a schematic diagram of an example system for static policy analysis in a network (e.g., Network Environment 100). Static Policy Analyzer 360 can perform assurance checks to detect configuration violations, logical lint events, contradictory or conflicting policies, unused contracts, incomplete configurations, etc. Static Policy Analyzer 360 can check the specification of the user's intent or intents in L_Model 270A to determine if any configurations in Controllers 116 are inconsistent with the specification of the user's intent or intents.

Static Policy Analyzer 360 can include one or more of the Operators 310 executed or hosted in Assurance Appliance 300. However, in other configurations, Static Policy Analyzer 360 can run one or more operators or engines that are separate from Operators 310 and/or Assurance Appliance 300. For example, Static Policy Analyzer 360 can be a VM, a cluster of VMs, or a collection of endpoints in a service function chain.

Static Policy Analyzer 360 can receive as input L_Model 270A from Logical Model Collection Process 366 and Rules 368 defined for each feature (e.g., object) in L_Model 270A. Rules 368 can be based on objects, relationships, definitions, configurations, and any other features in MIM 200. Rules 368 can specify conditions, relationships, parameters, and/or any other information for identifying configuration violations or issues.

Moreover, Rules 368 can include information for identifying syntactic violations or issues. For example, Rules 368 can include one or more rules for performing syntactic checks. Syntactic checks can verify that the configuration of L_Model 270A is complete, and can help identify configurations or rules that are not being used. Syntactic checks can also verify that the configurations in the hierarchical MIM 200 are complete (have been defined) and identify any configurations that are defined but not used. To illustrate, Rules 368 can specify that every tenant in L_Model 270A should have a context configured; every contract in L_Model 270A should specify a provider EPG and a consumer EPG; every contract in L_Model 270A should specify a subject, filter, and/or port; etc.

Rules 368 can also include rules for performing semantic checks and identifying semantic violations or issues. Semantic checks can check conflicting rules or configurations. For example, Rule1 and Rule2 can have aliasing issues, Rule1 can be more specific than Rule2 and thereby create conflicts/issues, etc. Rules 368 can define conditions which may result in aliased rules, conflicting rules, etc. To illustrate, Rules 368 can specify that an allow policy for a specific communication between two objects can conflict with a deny policy for the same communication between two objects if they allow policy has a higher priority than the deny policy, or a rule for an object renders another rule unnecessary.

Static Policy Analyzer 360 can apply Rules 368 to L_Model 270A to check configurations in L_Model 270A and output Configuration Violation Events 370 (e.g., alerts, logs, notifications, etc.) based on any issues detected. Configuration Violation Events 370 can include semantic or semantic problems, such as incomplete configurations, conflicting configurations, aliased rules, unused configurations, errors, policy violations, misconfigured objects, incomplete configurations, incorrect contract scopes, improper object relationships, etc.

In some cases, Static Policy Analyzer 360 can iteratively traverse each node in a tree generated based on L_Model 270A and/or MIM 200, and apply Rules 368 at each node in the tree to determine if any nodes yield a violation (e.g., incomplete configuration, improper configuration, unused configuration, etc.). Static Policy Analyzer 360 can output Configuration Violation Events 370 when it detects any violations.

FIG. 4 illustrates a flowchart for an example network assurance method. The method shown in FIG. 4 is provided by way of example, as there are a variety of ways to carry out the method. Additionally, while the example method is illustrated with a particular order of blocks, those of ordinary skill in the art will appreciate that FIG. 4 and the blocks shown therein can be executed in any order and can include fewer or more blocks than illustrated.

Each block shown in FIG. 4 represents one or more steps, processes, methods or routines in the method. For the sake of clarity and explanation purposes, the blocks in FIG. 4 are described with reference to Assurance Appliance 300, Models 270A-B, 272, 274, 276, and Network Environment 100, as shown in FIGS. 1A-B, 2D, and 3A.

At step 400, Assurance Appliance 300 can collect data and obtain models associated with Network Environment 100. The models can include Models 270A-B, 272, 274, 276. The data can include fabric data (e.g., topology, switch, interface policies, application policies, EPGs, etc.), network configurations (e.g., BDs, VRFs, L2 Outs, L3 Outs, protocol configurations, etc.), security configurations (e.g., contracts, filters, etc.), service chaining configurations, routing configurations, and so forth. Other information collected or obtained can include, for example, network data (e.g., RIB/FIB, VLAN, MAC, ISIS, DB, BGP, OSPF, ARP, VPC, LLDP, MTU, QoS, etc.), rules and tables (e.g., TCAM rules, ECMP tables, etc.), endpoint dynamics (e.g., EPM, COOP EP DB, etc.), statistics (e.g., TCAM rule hits, interface counters, bandwidth, etc.).

At step 402, Assurance Appliance 300 can analyze and model the received data and models. For example, Assurance Appliance 300 can perform formal modeling and analysis, which can involve determining equivalency between models, including configurations, policies, etc.

At step 404, Assurance Appliance 300 can generate one or more smart events. Assurance Appliance 300 can generate smart events using deep object hierarchy for detailed analysis, such as Tenants, switches, VRFs, rules, filters, routes, prefixes, ports, contracts, subjects, etc.

At step 406, Assurance Appliance 300 can visualize the smart events, analysis and/or models. Assurance Appliance 300 can display problems and alerts for analysis and debugging, in a user-friendly GUI.

In typical SDNs, policies can be configured in the SDN controller which ultimately deploys rules in the switches to control underlying traffic. In order to provide assurance for SDNs, in particular with respect to functioning of the networks using policies, deployments of the policies into the network as switch rules need to be modeled. More specifically, how and whether rules are deployed at nodes and switches in SDNs in response to configuration of policies in the controller need to be modeled in order to provide assurance for the networks. This is problematic as modeling deployments of policies often requires a deep understanding of SDN behavior and involves multiple interactions with SDN engineering teams to understand how to actually model these deployments. Often times this can take up to several months to complete based on the large number of interactions with SDN engineering teams required to create the deployment models. Additionally, modeling deployments of policies is problematic as different versions of SDNs can exhibit different behaviors that can require remodeling each time new versions of the networks are released. While ACI networks are referenced and described throughout this paper, the methods and systems described herein can be applied to other applicable SDNs, e.g. VMware NSX networks. More specifically, while the term ACI contract with reference to ACI networks is used throughout this paper, the systems and methods described herein can be applied for determining how policies are deployed in other SDNs.

In order to address these challenges, a deployment model for deploying rules in a network environment in response to deployment of one or more ACI contracts can be generated using policy configurations for implementing one or more policies the network environment in response to the deployment of the contracts into the network environment. More specifically, a deployment model can be generated by identifying candidate deployment configuration variables and corresponding policy configurations for the candidate deployment configuration variables. Subsequently, rule configurations states in the network environment corresponding to the different policy configurations can be used to formulate a deployment model for implementing the one or more policies in the network environment through the one or more contracts. The candidate deployment configuration variables used to identify the policy configurations for formulating the deployment model can be a subset of all configuration variables that define one or more policy configurations for implementing the one or more policies in the network environment. Accordingly, by generating a deployment model based on a subset of deployment configuration variables, the deployment model can be generated faster and with reduced user effort, e.g. engineer effort. Further, as deployment models for ACI networks can be generated more easily, the burdens of having to remodel ACI contracts for different versions of the ACI network can be reduced.

Additionally, in order to address these challenges, a deployment model for implementing policies in a network environment in response to deployment of one or more ACI contracts can be generated automatically, or semi-automatically, using candidate deployment configuration variables, corresponding policy configurations, and observed rule configuration states existing for the different policy configurations. More specifically, candidate deployment configuration variables associated with implementing policies according to ACI contracts can be defined by a user. Subsequently, policy configurations for deploying rules in the network environment to implement the policies can be determined in an automated manner based on the candidate deployment configuration variables. Further, different rule configuration states in the network environment according to the policy configurations can be automatically observed within the network environment. Subsequently, a deployment model for implementing policies in the network environment can automatically be determined based on the observed rule configuration states for the policy configurations corresponding to the candidate deployment configuration variables. For example, a deployment model can be automatically generated by analyzing policy configurations to determine if rules, according to policy configuration variables, are actually deployed to a particular switch, a generic switch, or all switches in a network environment through deployment of an ACI contract. Automated or semi-automated generation of deployments models can reduce amounts of user effort utilized to develop deployment models for ACI contracts. Further, automated or semi-automated generation of deployment models can reduce the burdens of having to remodel ACI contracts for different versions of the ACI network.

FIG. 5 illustrates an environment 500 for generating deployment models for contracts in network environments. The environment 500 can generate a deployment model for an ACI contract as part of providing assurance. For example, a deployment model for an ACI contract can be used to assure that a specific rule is deployed at a specific leaf in a network environment in response to deployment of an ACI contract. A deployment model for an ACI contract can specify whether specific rules are deployed in response to an ACI contract, whether rules are deployed to specific locations/nodes within an ACI network in response to the ACI contract, and whether rules are deployed in a correct direction from a perspective of a location/node in a network environment, e.g. rules are applied to egress and ingress traffic at a location/node in the network environment. More specifically, a deployment model can indicate directions a contract, and correspondingly deployed rules, are enforced in a network environment. For example, a deployment model of an ACI contract can include whether a specific TCAM rule is deployed to a specific switch in a network environment according to deployment of the ACI contract in the network environment. In another example, a deployment model of an ACI contract can include whether a forwarding policy is deployed across a network environment according to deployment of the ACI contract in the network environment.

The environment 500 shown in FIG. 5 includes a network environment 502, an ACI contract deployment modeling system 504, and an ACI contract deployment model data store 506. The network environment 502 can function according to an applicable network environment for providing network service access. For example, the network environment 502 can be a network environment of an enterprise configured to provide network service access. Additionally, the network environment 502 can be an emulated network environment. For example, the network environment 502 can be emulated from another network environment for purposes of identifying an ACI contract deployment model for an ACI contract deployed into the other network environment. By emulating a network environment for purposes of developing an ACI contract deployment model for the network environment, the network environment does not need to be accessed to develop the deployment model. In particular, the deployment model can be remotely created to ensure correct deployment of rules in a network environment without actually deploying a contract into an actual network environment, e.g. prevent crashes in the network environment in response to deployment of the contract.

The ACI contract deployment modelling system 504 can determine a deployment model for an ACI contract based on policy configurations identified in the network environment 502. More specifically, the ACI contract deployment modeling system 504 can identify policy configurations for one or more controllers in the network environment 502 in response to deployment of an ACI contract to the one or more controllers. Subsequently, the ACI contract deployment modeling system 504 can generate a deployment model for an ACI contract based on network policy configurations for the network environment 502 in response to deployment of the ACI contract into the network environment 502. For example, the ACI contract deployment modelling system 504 can determine, from network policy configurations, combinations of different rules deployed in a network environment in response to an ACI contract deployed in the network environment. Further in the example, the ACI contract deployment modelling system 504 can develop a deployment model for the ACI contract based on the combinations of different rules deployed in the network environment identified from the policy configurations.

Policy configurations at a controller include how a policy is implemented through a controller. More specifically, policy configurations at a controller include aspects of how the controllers deploy rules for implementing policies according to one or more ACI contracts deployed to the controllers. Policy configurations at one or more controllers can correspond to different policy configurations. Policy configurations include applicable states of policies implemented in a network environment at a specific location, e.g. logical or physical. Specifically, policy configurations can include controller policy configurations. Controller policy configurations can include logical models implemented at controllers, e.g. in response to deployment of an ACI contract.

Policy configurations can be determined from deployment configuration variables. Deployment configuration variables include applicable variables that define or otherwise are used to deploy rules into a network environment to implement policies in the network environment. Specifically, deployment configuration variables can define how a controller deploys rules into a network environment in order to implement a policy in a network environment in response to a deployed contract. For example, deployment configuration variables can specify for a controller to deploy rules to switches in a network environment to control traffic through specific endpoint groups in the network environment as part of implementing policies in the network environment. Further in the example, the deployment configuration variables can specify directions of the traffic to apply the rules to in implementing the policies in the network environment. Deployment configuration variables can be included as part of a subset of configuration variables that define how a policy is implemented in accordance with deployment of a contract. For example, configuration variables can include variables for controlling a controller to implement a policy in a network environment.

The ACI contract deployment modeling system 504 can control deployment of an ACI contract into a network environment. More specifically, the ACI contract deployment modeling system 504 can deploy an ACI contract to one or more controllers in a network environment for purposes of generating a deployment model for the ACI contract. In deploying an ACI contract into a network environment, the ACI contract deployment modeling system 504 can control deployment of the ACI contract to cause deployment of rules, e.g. stateless firewall rules in the network environment. The ACI contract deployment modeling system 504 can deploy an ACI contract into a network environment in response to input received from a user. For example, user input can include a request to generate a deployment model for a specific ACI contract and the ACI contract deployment modeling system 504 can subsequently deploy the ACI contract into a network environment in response to the request to generate the deployment model.

Further, the ACI contract deployment modeling system 504 can identify a deployment model for ACI contracts based on deployment configuration variables. Specifically, the ACI contract deployment modeling system 504 can identify policy configurations at one or more controllers for ACI contracts based on deployment configuration variables associated with enforcing policies according to the ACI contracts in a network environment. More specifically, the ACI contract deployment modeling system 504 can determine rule configuration states based on the policy configurations. Subsequently, the ACI contract deployment modeling system 504 can formulate a deployment for implementing a policy in a network environment based on the rule configuration states and policy configurations corresponding to deployment configuration variables.

The ACI contract deployment modeling system 504 can identify rule states/rule configuration states present in a network environment in response to deployment of policies into the network environment. Rule states can can include applicable states implemented for policy configurations associated with deploying rules in a network environment in accordance with an ACI contract to enforce a policy. Specifically, rule states can include whether a rule is enforced or not enforced in a network environment, whether a combination of rules are enforced or not enforced together in a network environment, whether one or a combination of rules are enforced or not enforced at a specific location/node in a network environment, whether one or more rules are enforced or not enforced to either or both egress network traffic and ingress network traffic, and where rules are deployed. For example, policy configuration variables can be defined to include that a specific forwarding policy rule is deployed to a switch in an ACI fabric.

Rule states can indicate how rules are deployed and otherwise implemented as part of switch policy states in a network environment. Specifically, rule states can include one or a combination of directions deployed rules are enforced, whether deployed rules are enforced one way or two way, what rules are created in implementing a policy according to a deployed contract, and how rules are created in implemented a policy according to a deployed contract. Further, deployment configuration variables defining policy configurations can otherwise be associated with or otherwise define different rule states. For example, a policy configuration at a controller can include how rules are created and deployed by the controller, as part of defined deployment configuration variables, in response to a deployed ACI contract used to enforce a policy.

The ACI contract deployment modeling system 504 can determine a deployment model using deployment configuration variables that correspond to either or both a subset of a policy configuration or a subset of policy configurations implemented at a controller. Specifically, the ACI contract deployment modeling system 504 can determine a deployment model using candidate deployment configuration variables for a subset of rules deployed or not deployed in a network environment in response to deployment of an ACI contract into the network environment. More specifically, the ACI contract deployment modeling system 504 can determine a deployment model for candidate deployment configuration variables that define a subset of an overall policy configuration at a controller that is used to control how one or more policies are implemented in a network environment.

In determining a deployment model using candidate deployment configuration variables for a subset of a policy configuration, the ACI contract deployment modeling system 504 can determine a deployment model according to candidate deployment configuration variables of a total number of deployment configuration variables defining the policy configuration. More specifically, the ACI contract deployment modeling system 504 can determine a deployment model from candidate deployment configuration variables that define a subset of a policy configuration used to deploy a subset of all TCAM rules deployed in response to an ACI contract. For example, the ACI contract deployment modeling system 504 can determine a deployment model based on a portion of a policy configuration, as defined by a subset of deployment configuration variables, that is used to deploy a first TCAM rule and a second TCAM rule of all TCAM rules according to the subset of deployment configuration variables.

By determining a deployment model for an ACI contract based on a subset of deployment configuration variables, e.g. candidate deployment configuration variables, that define a subset of an overall policy configuration, the ACI contract deployment modeling system 504 can determine a deployment model more easily for the ACI contract. Specifically, the ACI contract deployment modeling system 504 can determine the deployment model faster and with reduced user, e.g. engineer effort, as compared to currently used methods. For example, by determining a deployment model for an ACI contract using deployment configuration variables that define a subset of a policy configuration, the ACI contract deployment modeling system 504 can build the deployment model months faster than current techniques that require greater amounts of effort. Further, as deployment models for ACI networks can be generated by the ACI contract deployment modeling system 504 more easily based on a subset of deployment configuration variables as opposed to all or most deployment configuration variables and a corresponding policy configuration used to implement policy using the ACI contract, reduced burdens in having to remodel ACI contracts for different versions of the ACI networks can be achieved.

The ACI contract deployment modeling system 504 can identify one or more deployment configuration variables and corresponding values of deployment configuration variables to use in identifying a deployment model for an ACI contract. More specifically, the ACI contract deployment modeling system 504 can identify one or more deployment configuration variables and corresponding values of the variables from input received from an administrator or engineer. For example, the ACI contract deployment modeling system 504 can identify that a first EPG routing policy is true and that a second EPG routing policy is false, e.g. as part of values of policy configuration variables based on received input from an administrator. Further in the example, the ACI contract deployment modeling system 504 can use whether the first EPG routing policy is true and whether the second EPG routing policy is false in a network environment in response to deployment of an ACI contract into the network environment to determine a deployment model for the ACI contract. Subsequently, as will be discussed in greater detail later, the ACI contract deployment modeling system 504 can use identified variables and corresponding values to determine policy configurations and corresponding rule states to determine whether the variables are sufficient to identify a deployment model for an ACI contract. Specifically, the ACI contract deployment modeling system 504 can determine whether conflicting policy configurations exist according to the identified variables and corresponding values. If conflicting policy configuration states exist, then the ACI contract deployment modeling system 504 can change the identified variables and/or corresponding variables for purposes of identifying a deployment model.

The ACI contract deployment modeling system 504 can automatically or semi-automatically develop a deployment model based on deployment of an ACI contract into a network environment. Specifically, the ACI contract deployment modeling system 504 can iteratively select different deployment configuration variables and different values of deployment configuration variables, e.g. based on user input, for purposes of developing a deployment model for an ACI contract. For example, the ACI contract deployment modeling system 504 can select a first set of deployment configuration variables/candidate deployment configuration variables and automatically attempt to generate a deployment model for an ACI contract based on the first set of deployment configuration variables. Further in the example, the ACI contract deployment modeling system 504 can modify the deployment configuration variables used to identify the deployment model based on user input, e.g. modify the variables to define new policy configurations, and subsequently attempt to determine the deployment model using the modified deployment configuration variables. In automatically or semi-automatically developing a deployment model of an ACI contract the ACI contract deployment modeling system 504, as discussed previously, can reduce efforts in developing the deployment model. Further, as discussed previously, in automatically or semi-automatically developing a deployment model of an ACI contract, the ACI contract deployment modeling system 504 can reduce burdens in having to redevelop models for the ACI contract for different version of an ACI network.

The ACI contract deployment modeling system 504 can identify rule configuration states achieved in response to deployment of an ACI contract. Specifically, the ACI contract deployment modeling system 504 can identify different rule configuration states achieved for different policy configurations. More specifically, the ACI contract deployment modeling system 504 can identify different rule configuration states for different policy configurations defined by candidate deployment configuration variables for one or more policies. The ACI contract deployment modeling system 504 can identify rule configuration states based on data gathered by an applicable appliance for gathering data used to identify rule configuration states, such as the assurance appliances described herein.

Further, the ACI contract deployment modeling system 504 can use identified rule configuration states in a network environment achieved in response to deployment of an ACI contract into the network environment to determine a deployment model for the ACI contract. Specifically, the ACI contract deployment modeling system 504 can use policy configurations defined by candidate deployment configuration variables and corresponding rule configuration states observed for the policy configurations to identify a deployment model for an ACI contract. More specifically, the ACI contract deployment modeling system 504 can determine whether rule configuration states of rules deployed in the network environment in response to deployment of the ACI contract into the network environment corresponding to different policy states are actually present in the network environment. Subsequently, the ACI contract deployment modeling system 504 can identify a deployment model for the ACI contract based on whether the rule configuration states are present in the network environment.

The ACI contract deployment modeling system 504 can identify whether candidate deployment configuration variables are sufficient to formulate a deployment model. Specifically, the ACI contract deployment modeling system 504 can identify whether candidate deployment configuration variables and corresponding policy configurations are sufficient to determine a deployment model using rule configuration states observed for the different policy configurations. For example, if candidate deployment configuration variables and corresponding policy configurations fail to predict how all TCAM rules are deployed to implement one or more policies, then the ACI contract deployment modeling system 504 can determine the candidate deployment configuration variables are insufficient to formulate a deployment model for one or more contracts for the one or more policies. Subsequently, the ACI contract deployment modeling system 504 can formulate a deployment model based on whether the ACI contract deployment modeling system 504 determines candidate deployment configuration variables are sufficient to formulate the deployment model.

Additionally, the ACI contract deployment modeling system 504 can formulate a deployment model based on conflicting rule configuration states of corresponding policy configurations. Specifically, if conflicting rule configuration states exist, then the ACI contract deployment modeling system 504 can determine that the deployment configuration variables defining corresponding policy configurations of the conflicting rule configuration states are insufficient to use in formulated a deployment model. Alternatively, if non-conflicting rule configuration states exist, then the ACI contract deployment modeling system 504 can determine that the deployment configuration variables defining corresponding policy configurations of the conflicting rule configuration states are sufficient to use in formulated a deployment model and generate such a model. Rule configurations can conflict based on whether rule configuration states with different rules exist at a same node/location in a network environment, rule configuration states with different rules exists at a same node/location in a network environment, and/or rule configuration states with rules applied to different traffic directions exist at a same node/location in a network environment. For example, conflicting rule configuration states can be determined when an EPG forwarding policy is identified as being deployed to a first node in a network environment and not deployed to a second node in a network environment. In another example, conflicting rule configuration states can be determined when a policy is identified as being applied to only egress traffic in a first instance and only ingress traffic in another instance at the same location in a network environment.

The ACI contract deployment modeling system 504 can modify currently used candidate deployment configuration variables in response to a determination that the variables are insufficient for formulating a deployment model. Specifically, the ACI contract deployment modeling system 504 can manually modify currently used candidate deployment configuration variables, e.g. based on user input. More specifically, the ACI contract deployment modeling system 504 can add one or more new deployment configuration variables to candidate deployment configuration variables used in formulated a deployment model. For example, the ACI contract deployment modeling system 504 can add a new deployment configuration variable for deploying another rule to candidate deployment variables found insufficient for purposes of developing a deployment model. Subsequently, the ACI contract deployment modeling system 504 can use new or otherwise modified candidate deployment configuration variables to determine new corresponding policy configurations and additional rule configuration states associated with the new policy configurations. Subsequently, the ACI contract deployment modeling system 504 can either or both determine whether the modified candidate deployment configuration variables are sufficient for formulating a deployment model and actually determine a deployment model using the policy configurations and additional rule configuration states associated with the modified candidate deployment configuration variables.

Further, the ACI contract deployment modeling system 504 can identify new candidate deployment configuration variables or otherwise modify the candidate deployment configuration variables based on input received from a user, e.g. a network administrator. Specifically, the ACI contract deployment modeling system 504 can manually identify new candidate deployment configuration variables, e.g. based on user input. More specifically, in response to a determination that candidate deployment configuration variables are insufficient for formulating a deployment model, the ACI contract deployment modeling system 504 can query a user for additional input. Subsequently, the user can provide additional input indicating new deployment configuration variables, and the ACI contract deployment modeling system 504 can modify the candidate deployment configuration variables to include the new configuration variables, potentially while also keeping the old candidate deployment configuration variables.

The ACI contract deployment modeling system 504 can maintain a history of rule configuration states, potentially including corresponding policy configuration to the rule configuration states, in a network environment. In maintaining a history of rule configuration states in a network environment, the ACI contract deployment modeling system 504 can automatically detect if a candidate set of deployment configuration variables used to identify policy configurations is sufficient for modelling deployment of an ACI contract. For example, the ACI contract deployment modeling system 504 can use a history of rule configuration states to determine whether conflicting rule configuration states exist in a network environment. A history of rule configuration states can include rule configurations states identified for a given set of candidate deployment configuration variables and corresponding policy configurations. For example, a history of rule configuration states can indicate that specific EPG routing rules were deployed to a specific leaf router in response to deployment of an ACI contract into a network environment. In another example, a history of rule configuration states can indicate a first rule was deployed to a node in a network environment and no longer exists at the node in the network environment in response to deployment of an ACI contract into the network environment.

Further, the ACI contract deployment modeling system 504 can maintain a history of rule configuration states based on whether one or more candidate deployment configuration variables are sufficient for forumlating a deployment model. Specifically, the ACI contract deployment modeling system 504 can generate and update a history to include identified rule configuration states for policy configurations of corresponding candidate deployment configuration variables as the variables are presumed to be sufficient for formulating a deployment model. However, once the variables are identified as insufficient to formulate the deployment model the ACI contract deployment modeling system 504 can erase the identified rule configuration states from the history of rules configuration states. Subsequently, the ACI contract deployment modeling system 504 can begin to add to the history new rule configuration states observed for new policy configurations identified from new or otherwise modified deployment configuration variables.

The ACI contract deployment model data store 506 stores data indicating determined deployment models for ACI contracts in network environments. The ACI contract deployment model data store 506 can store data generated and/or updated by the ACI contract deployment modeling system as part of identifying deployment models of ACI contracts. A deployment model indicated by data stored in the ACI contract deployment model data store 506 can be used to provide assurance in ACI contract deployment. More specifically, a deployment model indicated by data stored in the ACI contract deployment model data store 506 can be used to ensure rules are deployed correctly in response to deployment of an ACI contract in a network environment.

FIGS. 6A-C show a flow of pseudo-code of an example of operation of the example environment 500 shown in FIG. 5 for identifying a deployment model. Specifically, the flow of pseudo-code shown in FIGS. 6A-C is implemented by the ACI contract deployment modeling system 504 to identify characteristics of a rule, including whether a rule exists, for controlling communication from L3OutEPG to AEPG. L3OutEPG is an endpoint group in a data-center network that is used to communicate with the external Internet. AEPG is an application endpoint group in the data-center network that is used by applications running in the data-center network. Accordingly, the pseudo-code is used to identify characteristics of a rule for controlling communication from the applications at AEPG to the external Internet, through L3OutEPG. In the pseudo-code, observationHistory indicates tested policy configurations for use in developing a deployment model. Further, rulePresent in the pseudo-code indicates whether or not a given rule configuration state is observed. Specifically, rulePresent indicates whether a rule corresponding to a specific policy configuration has been observed.

In the example of operation, the ACI contract deployment modeling system 504 initially sets observationHistory to empty as a rule and corresponding rule configuration states have not been examined in the system. Further, the ACI contract deployment modeling system 504 initially sets rulePresent to empty as a rule and corresponding rule configuration states have not been examined.

Then, the ACI contract deployment modeling system 504 identifies a policy configuration of aepgEnforcement set to true and l3OutEPGEnforcement set to true. aepgEnforcement is a candidate deployment configuration variable that defines whether a contract is needed to communicate with AEPG. Specifically, aepgEnforcement set to true defines that a contract is needed to communicate with AEPG. Conversely, aepgEnforcement set to false defines that a contract is not needed to communicate with AEPG. Further, l3OutEPGEnforcement is a candidate deployment configuration variable that defines whether a contract is needed to communicate with L3OutEPG. Specifically, l3OutEPGEnforcement set to true defines that a contract is needed to communicate with L3OutEPG. Conversely, l3OutEPGEnforcement set to false defines that a contract is not needed to communicate with L3OutEPG. Accordingly, the policy configuration of aepgEnforcement set to true and l3OutEPG enforcement set to true defines that a contract is needed to communicate with both AEPG and L3OutEPG.

In response to this policy configuration, the ACI contract deployment modeling system 504 examines corresponding rule configuration states to determine whether a rule exists that allows communication with AEPG and L3OutEPG in response to a contract deployment. In this case, the ACI contract deployment modeling system 504 identifies that a rule does actually exist that allows communication from L3OutEPG to AEPG in response to the contract. The ACI contract deployment modeling system 504 can check observationHistory to see whether this policy configuration is in the history. In this case, the ACI contract deployment modeling system 504 observes that this policy configuration is not in observationHistory and can thus set observationHistory, e.g. create an entry in observationHistory, indicating the policy configuration of a contract is needed to communicate with both AEPG and L3OutEPG. Further, the ACI contract deployment modeling system 504 can set rulePresent to indicate a rule is observed for this policy configuration.

Next, the ACI contract deployment modeling system 504 identifies a policy configuration of aepgEnforcement set to true and l3OutEPGEnforcement set to false. This policy configuration defines that communication is only allowed with AEPG with a contract while communication with L3OutEPG is allowed without a contract. In this case, the ACI contract deployment modeling system 504 does not see a rule in a rule configuration state corresponding to this policy configuration. Subsequently, the ACI contract deployment modeling system 504 checks that this policy configuration is not part of observationHistory. In response, to determining this policy configuration is not part of observationHistory, the ACI contract deployment modeling system 504 adds the entry of this policy configuration to observationHistory. Further, as a rule was not observed for this policy configuration, the ACI contract deployment modeling system 504 can keep rulePresent as is, e.g. effectively signifying in observationHistory that a rule was not observed for this policy configuration.

Next, the ACI contract deployment modeling system 504 identifies a policy configuration of aepgEnforcement set to false and l3OutEPGEnforcement set to true. This policy configuration defines that communication is allowed with AEPG without a contract while communication with l3OutEPG is only allowed with a contract. In this case, the ACI contract deployment modeling system 504 does see a rule in a rule configuration state corresponding to this policy configuration. Subsequently, the ACI contract deployment modeling system 504 checks that this policy configuration is not part of observationHistory. In response, to determining this policy configuration is not part of observationHistory, the ACI contract deployment modeling system 504 adds the entry of this policy configuration to observationHistory. Further, as a rule was observed for this policy configuration, the ACI contract deployment modeling system 504 can set rulePresent to the policy configuration, e.g. effectively signifying in observationHistory that a rule was not observed for this policy configuration.

Then, the ACI contract deployment modeling system 504 identifies a policy configuration of aepgEnforcement set to true and l3OutEPGEnforcement set to true. As discussed previously, this policy configuration defines that communication is only allowed with AEPG with a contract while communication with l3OutEPG is only allowed with a contract. In this case, the ACI contract deployment modeling system 504 does not see a rule in a rule configuration state corresponding to this policy configuration.

The ACI contract deployment modeling system 504 checks observationHistory and identifies that this policy configuration has been analyzed previously. Further, the ACI contract deployment modeling system 504 checks rulePresent and identifies that a rule was previously found for this policy configuration. This is in contrast to the current observation that a rule is not present for this configuration. Accordingly, the ACI contract deployment modeling system 504 identifies that a conflict exists for these candidate deployment configuration variables. This can correspond to a presence of a run-time ACI bug. Additionally, this can correspond to a need for one or more additional candidate configuration variable to identify the deployment model. Specifically, in this scenario, a candidate configuration variable defining enforcement direction of the rule, aEPGCtxEnforcementDir, is needed to identify the deployment model. More specifically, whether the rule is actually implemented on a switch of AEPG or a switch of l3OutEPG cannot be determined from only the configuration variables aepgEnforcement and l3OutEPGEnforcement. Accordingly, the ACI contract deployment modeling system 504 can add the configuration variable aEPGCtxEnforcementDir with aepgEnforcement and l3OutEPGEnforcement and return to the beginning of the flow of pseudo-code and try to develop the deployment model using all three variables.

FIG. 7 illustrates a flowchart for an example method of identifying a deployment model for implementing one or more policies using one or more ACI contracts. The method shown in FIG. 7 is provided by way of example, as there are a variety of ways to carry out the method. Additionally, while the example method is illustrated with a particular order of blocks, those of ordinary skill in the art will appreciate that FIG. 7 and the blocks shown therein can be executed in any order and can include fewer or more blocks than illustrated.

Each block shown in FIG. 7 represents one or more steps, processes, methods or routines in the method. For the sake of clarity and explanation purposes, the blocks in FIG. 6 are described with reference to the environment 500, shown in FIG. 5.

At step 700, the ACI contract deployment modeling system 504 deploys an ACI contract into a network environment. An ACI contract can be provided by a user and subsequently deployed into a network environment in response to instructions to deploy the contract received from the user. Further, an ACI contract can be a contract that is already deployed into a network environment, and the ACI contract deployment modeling system 504 can deploy the contract into another network environment, e.g. a network environment that is emulated, for purposes of developing a deployment model for the ACI contract.

At step 702, the ACI contract deployment modeling system 504 identifies one or more candidate deployment configuration variables and corresponding policy configurations associated with enforcing policies according to the ACI contract in the network environment. The one or more candidate deployment configuration variables can form a subset of deployment configuration variables used to implement one or more policies according to the ACI contract. More specifically, the candidate deployment configuration variables identified by the ACI contract deployment modeling system 504 can only include only a subset of configuration variables used by one or more controllers in the network environment to enforce one or more policies according to the ACI contract. In turn, this can reduce an amount of computational time and effort put forth in developing a deployment model for the ACI contract. The one or more candidate deployment configuration variables and corresponding policy configurations can be identified based on user input. Specifically, a user can input candidate deployment configuration variables and the ACI contract deployment modeling system 504 can identify corresponding policy configurations for all or a subset of different combinations of the variables and values of the variables.

At step 704, the ACI contract deployment modeling system 504 identifies rule configuration states for the network environment in response to deploying the ACI contract into the network environment. More specifically, the ACI contract deployment modeling system 504 can identify rule configuration states that correspond to the policy configurations for the one or more candidate deployment configuration variables. For example, rule configuration states identified by the ACI contract deployment modeling system 504 can include rules deployed according to the policy configurations at controllers and defined by the one or more policy configuration variables. The ACI contract deployment modeling system 504 can identify policy configurations, e.g. through received events, generated by the assurance appliance 300 implemented in the network environment.

At decision point 706, the ACI contract deployment modeling system 504 identifies whether a deployment model for deploying rules in the network environment can be determined based on the one or more candidate deployment configuration variables using the corresponding rule configuration states. Specifically, at decision point 706, the ACI contract deployment modeling system 504 can determine if conflicting rule configuration states exist in the network environment for the corresponding policy configurations defined by the one or more candidate deployment configuration variables in response to deployment of the ACI contract into the network environment. For example, the ACI contract deployment modeling system 504 can first poll leafs in the network environment to determine if first and second rules are both deployed to the leafs. Further in the example, the ACI contract deployment modeling system 504 can determine that both rules are deployed at the leafs and update a configuration state history accordingly. Subsequently, the ACI contract deployment modeling system 504 can poll the leafs again to determine if both rules are deployed at the leafs. If the ACI contract deployment modeling system 504 finds that the both rules are not deployed at the leads, e.g. using the policy configurations, then the ACI contract deployment modeling system 504 can determine a conflicting rule configuration state exists in the network environment.

If it is determined at decision point 706, that the one or more candidate deployment configuration variables are insufficient to determine a deployment model, then the flow returns back to step 702, where the candidate deployment configuration variables associated with enforcing the ACI contract in the network environment are modified. Specifically, the ACI contract deployment modeling system 504 can query a user for input and subsequently identify additional deployment configuration variables from the received user input. For example, if the ACI contract deployment modeling system 504 identifies a conflicting rule configuration state exists in the network environment according to a policy configuration defined by a first set of candidate deployment configuration variables, then the ACI contract deployment modeling system 504 can add a new deployment configuration variable to the set of candidate deployment configuration variables for purposes of forming the deployment model.

If it is determined at decision point 706 that a deployment model can be determined, then the flow moves to step 708 where a deployment model is determined for implementing the one or more policies in the network environment using the ACI contract. In particular, if the ACI contract deployment modeling system 504 fails to find that a conflicting rule configuration state exits in the network environment, then the ACI contract deployment modeling system 504 can build a full deployment model for the ACI contract. Specifically, the ACI contract deployment modeling system 504 can build a deployment model for the ACI contract based on the rule configuration states observed for the policy configurations defined by the one or more candidate deployment variables.

The disclosure now turns to FIGS. 8 and 9, which illustrate example network devices and computing devices, such as switches, routers, load balancers, client devices, and so forth.

FIG. 8 illustrates an example network device 800 suitable for performing switching, routing, load balancing, and other networking operations. Network device 800 includes a central processing unit (CPU) 804, interfaces 802, and a bus 810 (e.g., a PCI bus). When acting under the control of appropriate software or firmware, the CPU 804 is responsible for executing packet management, error detection, and/or routing functions. The CPU 804 preferably accomplishes all these functions under the control of software including an operating system and any appropriate applications software. CPU 804 may include one or more processors 808, such as a processor from the INTEL X86 family of microprocessors. In some cases, processor 808 can be specially designed hardware for controlling the operations of network device 800. In some cases, a memory 806 (e.g., non-volatile RAM, ROM, etc.) also forms part of CPU 804. However, there are many different ways in which memory could be coupled to the system.

The interfaces 802 are typically provided as modular interface cards (sometimes referred to as "line cards"). Generally, they control the sending and receiving of data packets over the network and sometimes support other peripherals used with the network device 800. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 804 to efficiently perform routing computations, network diagnostics, security functions, etc.

Although the system shown in FIG. 8 is one specific network device of the present invention, it is by no means the only network device architecture on which the present invention can be implemented. For example, an architecture having a single processor that handles communications as well as routing computations, etc., is often used. Further, other types of interfaces and media could also be used with the network device 800.

Regardless of the network device's configuration, it may employ one or more memories or memory modules (including memory 806) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 806 could also hold various software containers and virtualized execution environments and data.

The network device 800 can also include an application-specific integrated circuit (ASIC), which can be configured to perform routing and/or switching operations. The ASIC can communicate with other components in the network device 800 via the bus 810, to exchange data and signals and coordinate various types of operations by the network device 800, such as routing, switching, and/or data storage operations, for example.

FIG. 9 illustrates a computing system architecture 900 wherein the components of the system are in electrical communication with each other using a connection 905, such as a bus. Exemplary system 900 includes a processing unit (CPU or processor) 910 and a system connection 905 that couples various system components including the system memory 915, such as read only memory (ROM) 920 and random access memory (RAM) 925, to the processor 910. The system 900 can include a cache of high-speed memory connected directly with, in close proximity to, or integrated as part of the processor 910. The system 900 can copy data from the memory 915 and/or the storage device 930 to the cache 912 for quick access by the processor 910. In this way, the cache can provide a performance boost that avoids processor 910 delays while waiting for data. These and other modules can control or be configured to control the processor 910 to perform various actions. Other system memory 915 may be available for use as well. The memory 915 can include multiple different types of memory with different performance characteristics. The processor 910 can include any general purpose processor and a hardware or software service, such as service 1 932, service 2 934, and service 3 936 stored in storage device 930, configured to control the processor 910 as well as a special-purpose processor where software instructions are incorporated into the actual processor design. The processor 910 may be a completely self-contained computing system, containing multiple cores or processors, a bus, memory controller, cache, etc. A multi-core processor may be symmetric or asymmetric.

To enable user interaction with the computing device 900, an input device 945 can represent any number of input mechanisms, such as a microphone for speech, a touch-sensitive screen for gesture or graphical input, keyboard, mouse, motion input, speech and so forth. An output device 935 can also be one or more of a number of output mechanisms known to those of skill in the art. In some instances, multimodal systems can enable a user to provide multiple types of input to communicate with the computing device 900. The communications interface 940 can generally govern and manage the user input and system output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof.

The storage device 930 can include services 932, 934, 936 for controlling the processor 910. Other hardware or software modules are contemplated. The storage device 930 can be connected to the system connection 905. In one aspect, a hardware module that performs a particular function can include the software component stored in a computer-readable medium in connection with the necessary hardware components, such as the processor 910, connection 905, output device 935, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method comprising:
    deploying one or more contracts into a network environment;
    selecting one or more candidate deployment configuration variables corresponding to a subset of a total number of policy configuration variables for implementing, at one or more controllers in the network environment that are distinct from one or more endpoint groups in the network environment, one or more policies in the network environment for controlling network behaviors in the network environment through the one or more contracts;
    determining policy configurations, at the one or more controllers, for deploying a subset of rules in the network environment of a total number of rules implemented as part of implementing the one or more policies in the network environment based on the one or more candidate deployment configuration variables, wherein the policy configurations at the one or more controllers comprise a subset of one or more overall policy configurations implemented at the one or more controllers in the network environment in response to the one or more contracts;
    identifying, based on deployment of the one or more contracts in the network environment, rule configuration states in the network environment corresponding to the policy configurations determined from the one or more candidate deployment configuration variables; and
    forming a deployment model for implementing the one or more policies in the network environment based on the policy configurations and the rule configuration states corresponding to the policy configurations with respect to a history of rule configuration states for the one or more endpoint groups that is maintained at the one or more controllers.

2. The method of claim 1, wherein the one or more candidate deployment configuration variables are manually selected by a user.

3. The method of claim 1, wherein the policy configurations include controller network policy states at one or more controllers in the network environment and the controller network policy states are defined, at least in part, by the one or more candidate deployment configuration variables.

4. The method of claim 3, wherein the controller network policy states at the one or more controllers include logical models implemented at the one or more controllers in the network environment in response to deployment of the one or more contracts into the network environment.

5. The method of claim 1, wherein the rule configuration states include switch policy states at one or more switches in the network environment and the switch policy states are observed at the one or more switches according to the policy configurations.

6. The method of claim 5, wherein the switch policy states include at least one of TCAM rules deployed at one or more switches in the network environment, policy indicators of the TCAM rules deployed at the one or more switches in the network environment, and action indicators associated with the TCAM rules deployed at the one or more switches in the network environment.

7. The method of claim 1, further comprising:
    determining whether the one or more candidate deployment configuration variables are sufficient to formulate the deployment model using the policy configurations and the rule configuration states corresponding to the policy configurations; and
    forming the deployment model using the policy configurations and the rule configuration states corresponding to the policy configurations if it is determined that the one or more candidate deployment configuration variable are sufficient to formulate the deployment model.

8. The method of claim 7, further comprising:
    selecting one or more additional candidate deployment configuration variables for implementing the one or more policies in the network environment through the one or more contracts if it is determined that the one or more candidate deployment configuration variables are insufficient to formulate the deployment model;
    determining additional policy configurations for deploying the rules in the network environment based on the one or more additional candidate deployment configuration variables;
    identifying, based on deployment of the one or more contracts in the network environment, additional rule configuration states in the network environment corresponding to the additional policy configurations determined from the one or more additional candidate deployment configuration variables; and
    forming the deployment model for implementing the one or more policies in the network environment based on the additional policy configurations and the additional rule configuration states corresponding to the additional policy configurations.

9. The method of claim 8, wherein the one or more additional candidate deployment configuration variables are manually selected by a user.

10. The method of claim 8, wherein the rule configuration states for the corresponding policy configurations are maintained in the history of rule configuration states and the history of rule configuration states is maintained based on whether the one or more candidate deployment configuration variables are sufficient to formulate the deployment model.

11. The method of claim 10, further comprising:
    erasing the rule configuration states from the history of rule configuration states if it is determined that the one or more candidate deployment configuration variables are insufficient to formulate the deployment model; and adding the additional rule configuration states corresponding to the additional policy configurations to the history of rule configuration states;

using the additional rule configuration states in the history of rule configuration states to form the deployment model based on the additional policy configurations and the additional rule configuration states.

12. The method of claim 7, further comprising:

identifying whether one or more conflicting rule configuration states exist between the rule configuration states in the network environment corresponding to the policy configurations determined from the one or more candidate deployment configuration variables; and determining that the one or more candidate deployment configuration variables are insufficient to formulate the deployment model if the one or more conflicting rules state exist between the rule configuration states in the network environment corresponding to the policy configurations determined from the one or more candidate deployment configuration variables.

13. The method of claim 1, wherein the one or more contracts are SDN policies for the network environment.

14. A system comprising:

one or more processors; and at least one computer-readable storage medium having stored therein instructions which, when executed by the one or more processors, cause the one or more processors to perform operations comprising:

deploying one or more contracts into a network environment;

selecting one or more candidate deployment configuration variables input by a user and corresponding to a subset of a total number of policy configuration variables for implementing, at one or more controllers in the network environment that are distinct from one or more endpoint groups in the network environment, one or more policies in the network environment for controlling network behaviors in the network environment through the one or more contracts;

determining policy configurations, at the one or more controllers, for deploying a subset of rules in the network environment of a total number of rules implemented as part of implementing the one or more policies in the network environment based on the one or more candidate deployment configuration variables, wherein the policy configurations at the one or more controllers comprise a subset of one or more overall policy configurations implemented at the one or more controllers in the network environment in response to the one or more contracts;

identifying, based on deployment of the one or more contracts in the network environment, rule configuration states in the network environment corresponding to the policy configurations determined from the one or more candidate deployment configuration variables; and forming a deployment model for implementing the one or more policies in the network environment based on the policy configurations and the rule configuration states corresponding to the policy configurations with respect to a history of rule configuration states for the one or more endpoint groups that is maintained at the one or more controllers.

15. The system of claim 14, wherein the instructions which, when executed by the one or more processors, further cause the one or more processors to perform operations comprising:

determining whether the one or more candidate deployment configuration variables are sufficient to formulate the deployment model using the policy configurations and the rule configuration states corresponding to the policy configurations; and forming the deployment model using the policy configurations and the rule configuration states corresponding to the policy configurations if it is determined that the one or more candidate deployment configuration variable are sufficient to formulate the deployment model.

16. The system of claim 15, wherein the instructions which, when executed by the one or more processors, further cause the one or more processors to perform operations comprising:

selecting one or more additional candidate deployment configuration variables for implementing the one or more policies in the network environment through the one or more contracts if it is determined that the one or more candidate deployment configuration variables are insufficient to formulate the deployment model;

determining additional policy configurations for deploying the rules in the network environment based on the one or more additional candidate deployment configuration variables;

identifying, based on deployment of the one or more contracts in the network environment, additional rule configuration states in the network environment corresponding to the additional policy configurations determined from the one or more additional candidate deployment configuration variables; and forming the deployment model for implementing the one or more policies in the network environment based on the additional policy configurations and the additional rule configuration states corresponding to the additional policy configurations.

17. The system of claim 16, wherein the one or more additional candidate deployment configuration variables are manually selected by a user.

18. The system of claim 15, wherein the instructions, which when executed by the one or more processors, further cause the one or more processors to perform operations comprising:

identifying whether one or more conflicting rule configuration states exist between the rule configuration states in the network environment corresponding to the policy configurations determined from the one or more candidate deployment configuration variables; and determining that the one or more candidate deployment configuration variables are insufficient to formulate the deployment model if the one or more conflicting rules state exist between the rule configuration states in the network environment corresponding to the policy configurations determined from the one or more candidate deployment configuration variables.

19. A non-transitory computer-readable storage medium having stored therein instructions which, when executed by a processor, cause the processor to perform operations comprising:

deploying one or more contracts into a network environment;

selecting one or more candidate deployment configuration variables corresponding to a subset of a total number of policy configuration variables for implementing, at one or more controllers in the network environment that are distinct from one or more endpoint groups in the network environment, one or more policies in the network environment for controlling network behaviors in the network environment through the one or more contracts;

determining policy configurations, at the one or more controllers, for deploying a subset of rules in the network environment of a total number of rules implemented as part of implementing the one or more policies in the network environment based on the one or more candidate deployment configuration variables, wherein the policy configurations at the one or more controllers comprise a subset of one or more overall policy configurations implemented at the one or more controllers in the network environment in response to the one or more contracts;

identifying, by a network assurance appliance based on deployment of the one or more contracts in the network environment, rule configuration states in the network environment corresponding to the policy configurations determined from the one or more candidate deployment configuration variables; and forming a deployment model for implementing the one or more policies in the network environment based on the policy configurations and the rule configuration states corresponding to the policy configurations with respect to a history of rule configuration states for the one or more endpoint groups that is maintained at the one or more controllers.

20. The system of claim 14, wherein the one or more contracts are SDN policies for the network environment.

\* \* \* \* \*